United States Patent
Hwang

(10) Patent No.: US 11,937,156 B2
(45) Date of Patent: Mar. 19, 2024

(54) CPM MESSAGE DIVISION METHOD USING OBJECT STATE SORTING

(71) Applicant: LG ELECTRONICS INC., Seoul (KR)

(72) Inventor: Jaeho Hwang, Seoul (KR)

(73) Assignee: LG ELECTRONICS INC., Seoul (KR)

( * ) Notice: Subject to any disclaimer, the term of this patent is extended or adjusted under 35 U.S.C. 154(b) by 426 days.

(21) Appl. No.: 17/423,837

(22) PCT Filed: Jan. 20, 2020

(86) PCT No.: PCT/KR2020/000932
§ 371 (c)(1),
(2) Date: Jul. 16, 2021

(87) PCT Pub. No.: WO2020/149714
PCT Pub. Date: Jul. 23, 2020

(65) Prior Publication Data
US 2022/0086609 A1    Mar. 17, 2022

(30) Foreign Application Priority Data
Jan. 18, 2019  (KR) .......................... 10-2019-0006604

(51) Int. Cl.
*H04W 4/40* (2018.01)
*H04W 4/02* (2018.01)
*H04W 4/38* (2018.01)

(52) U.S. Cl.
CPC ............. *H04W 4/40* (2018.02); *H04W 4/023* (2013.01); *H04W 4/38* (2018.02)

(58) Field of Classification Search
CPC . H04W 12/0431; H04W 40/02; H04W 40/24; H04W 48/18; H04W 76/16;
(Continued)

(56) References Cited

U.S. PATENT DOCUMENTS

2018/0005460 A1    1/2018  Alieiev et al.
2018/0152819 A1*   5/2018  Pinheiro ................. H04W 4/80
(Continued)

FOREIGN PATENT DOCUMENTS

EP       3448072 A1 *  2/2019  ............ H04L 63/14
KR       2018128946     7/2018

OTHER PUBLICATIONS

PCT International Application No. PCT/KR2020/000932, International Search Report dated May 7, 2020, 5 pages.
(Continued)

*Primary Examiner* — Nathan S Taylor
(74) *Attorney, Agent, or Firm* — LEE, HONG, DEGERMAN, KANG & WAIMEY

(57) ABSTRACT

According to the present specification, a collective perception service message (CPM) division method by a first V2X communication device may comprise the steps of: acquiring data related to neighboring objects; generating a CPM including data related to the neighboring objects by using data related to the neighboring objects; on the basis of a sorting type configured in the first V2X communication device, dividing the CPM when the size of the CPM exceeds a configured maximum transmission unit (MTU); and transmitting the divided CPM to a second V2X communication device, wherein the sorting type may be configured to partition an area in which the neighboring objects are located, by using calculated location information of the neighboring objects, with reference to a location of the first V2X communication device and on the basis of the CPM.

20 Claims, 11 Drawing Sheets

(58) Field of Classification Search
CPC ... H04W 84/042; H04W 84/06; H04W 88/06; H04W 76/15; H04W 84/04; H04W 4/023; H04W 4/38; H04W 4/40; H04W 4/02; H04W 4/12; H04L 45/24; H04L 45/302; H04L 47/78; H04L 65/80; H04L 65/1095; H04L 65/762; H04L 65/75; H04L 9/40; H04L 47/36

See application file for complete search history.

(56) References Cited

U.S. PATENT DOCUMENTS

| | | | | |
|---|---|---|---|---|
| 2018/0159935 A1* | 6/2018 | Cavalcanti | | H04W 4/40 |
| 2018/0285658 A1 | 10/2018 | Gunther et al. | | |
| 2018/0365909 A1* | 12/2018 | Cheng | | H04Q 9/00 |
| 2019/0051151 A1* | 2/2019 | Mueck | | G08G 1/0145 |
| 2019/0068639 A1* | 2/2019 | Alexander | | H04W 4/46 |
| 2019/0098088 A1* | 3/2019 | Baltar | | H04L 43/08 |
| 2019/0221110 A1* | 7/2019 | Vanderveen | | G01S 13/74 |
| 2019/0294966 A1* | 9/2019 | Khan | | H04W 4/40 |
| 2020/0077238 A1* | 3/2020 | Alexander | | H04W 4/40 |
| 2020/0077278 A1* | 3/2020 | Jornod | | H04W 16/18 |
| 2020/0160694 A1* | 5/2020 | Jornod | | G08G 1/0141 |
| 2020/0228946 A1* | 7/2020 | Hwang | | H04W 4/40 |
| 2020/0367096 A1* | 11/2020 | Hwang | | H04W 74/0808 |
| 2020/0374053 A1* | 11/2020 | Hwang | | H04W 4/40 |
| 2021/0067926 A1* | 3/2021 | Hwang | | H04W 4/44 |
| 2022/0005353 A1* | 1/2022 | Hwang | | H04W 4/40 |
| 2022/0103986 A1* | 3/2022 | Hwang | | H04W 4/38 |
| 2022/0107382 A1* | 4/2022 | Hwang | | H04W 64/00 |

OTHER PUBLICATIONS

Qualcomm Incorporated, "Traffic models for NR V2X evaluation scenarios," 3GPP TSG RAN WG1 Meeting #93, R1-1807382, May 2018, 6 pages.

* cited by examiner

[FIG. 1]
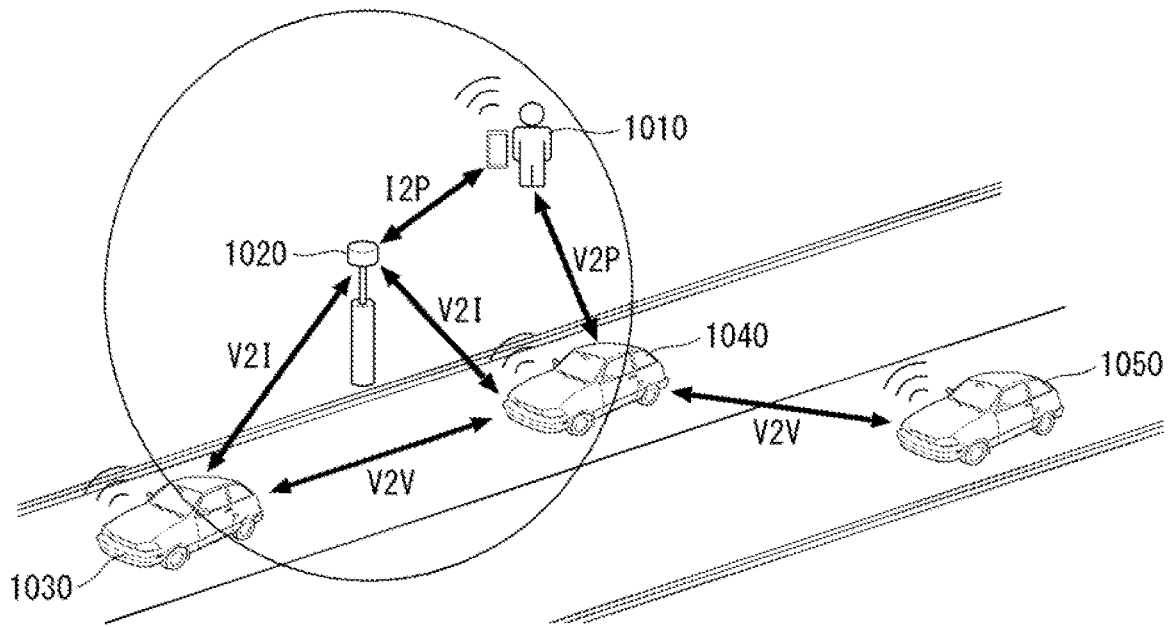
[FIG. 2]
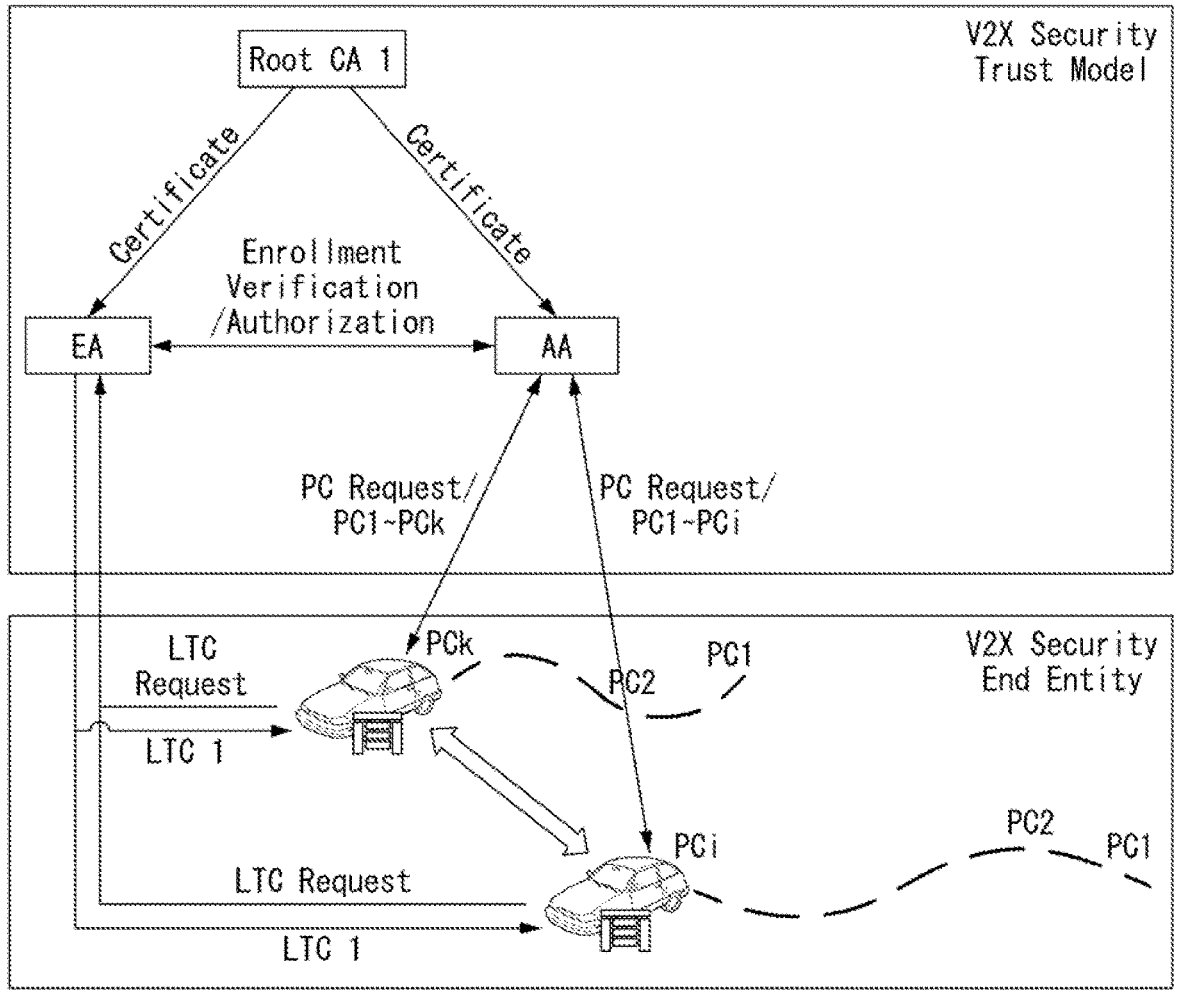

[FIG. 3]
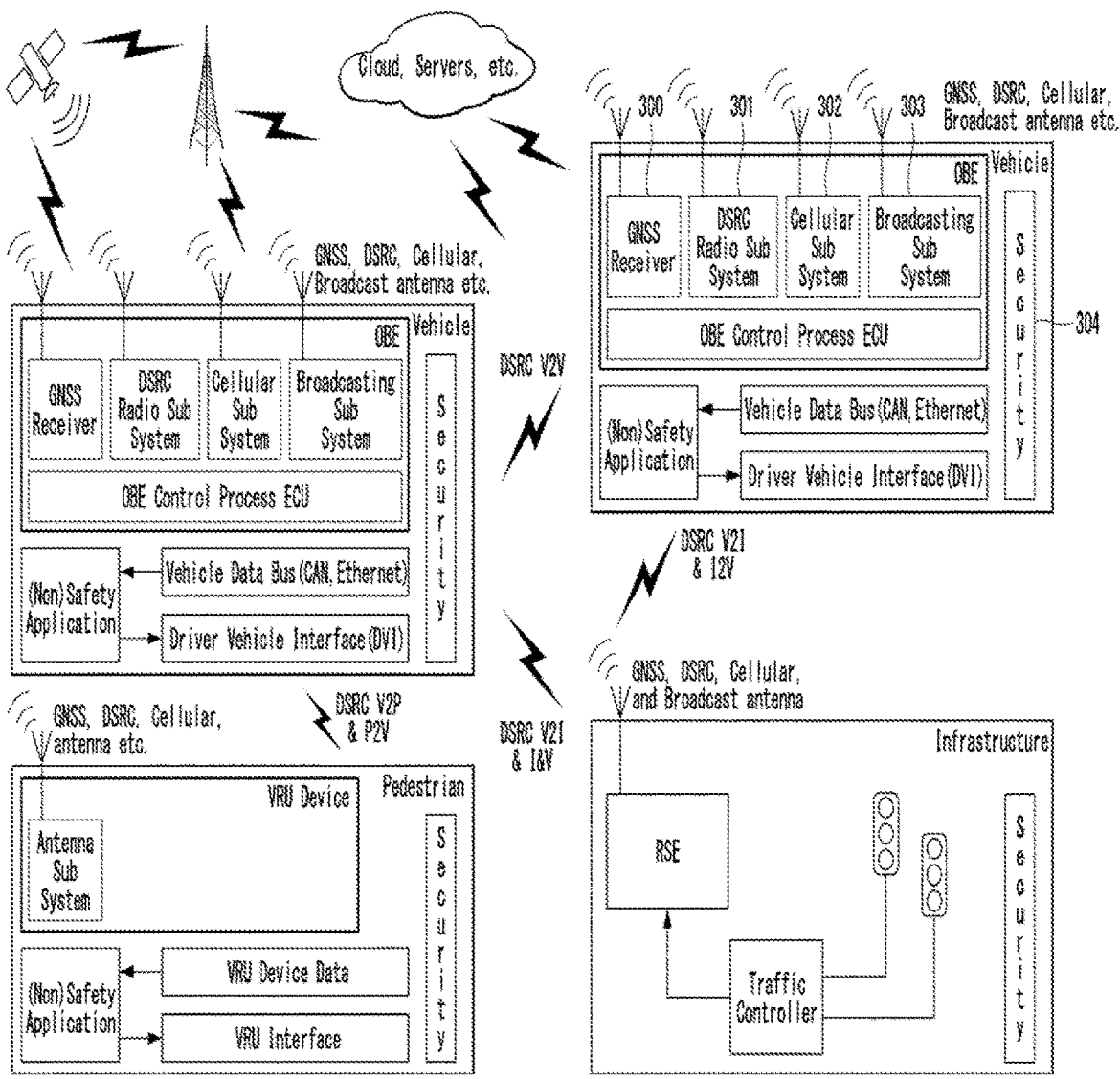

[FIG. 4]
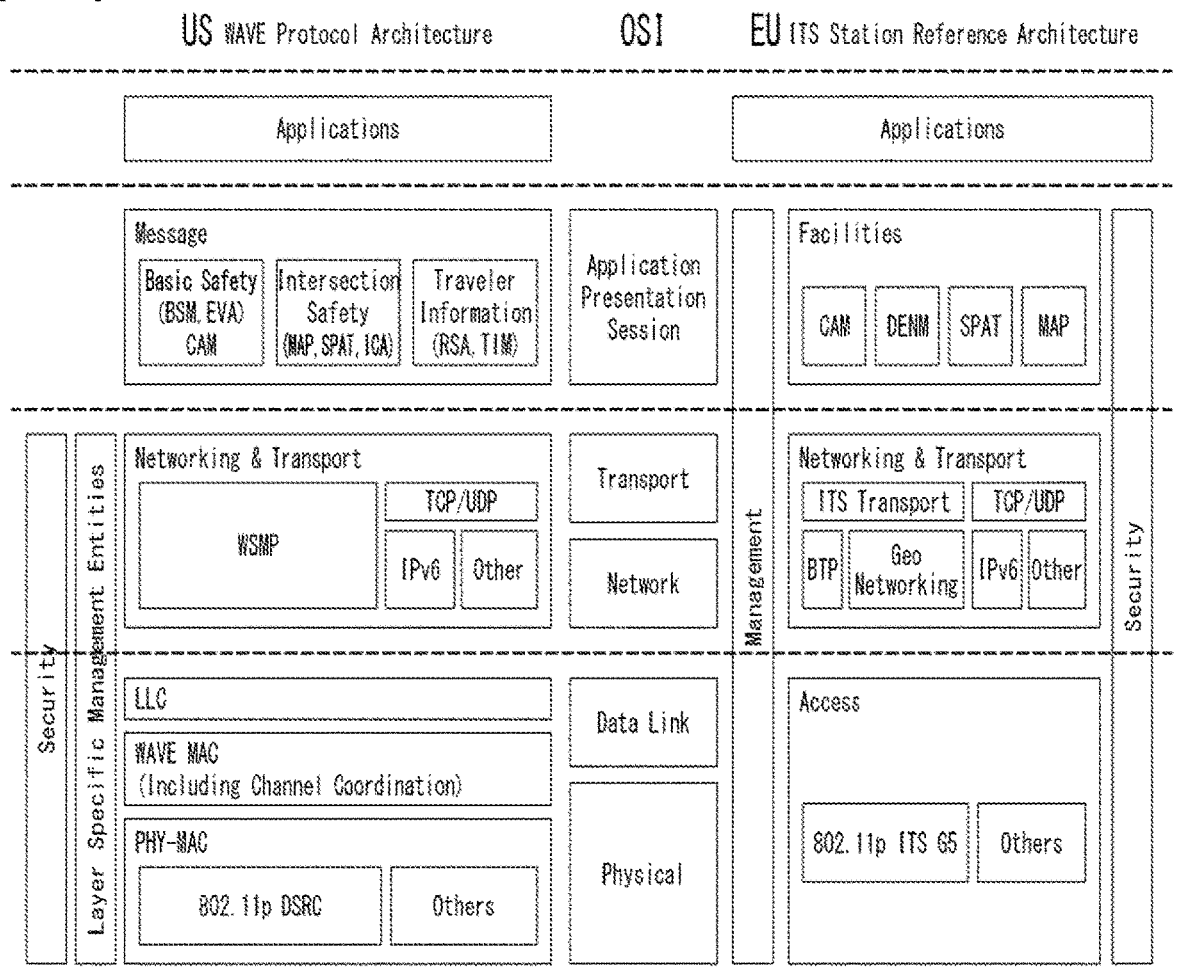

[FIG. 5]
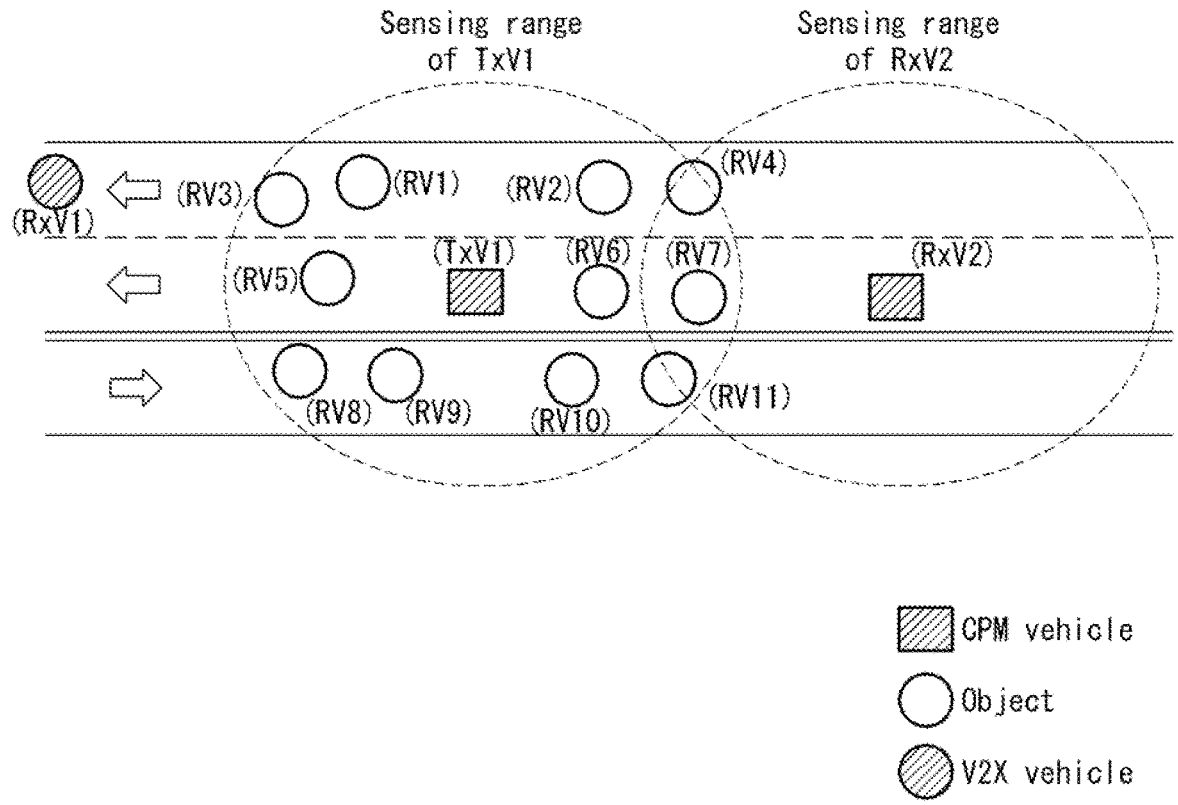
[FIG. 6]
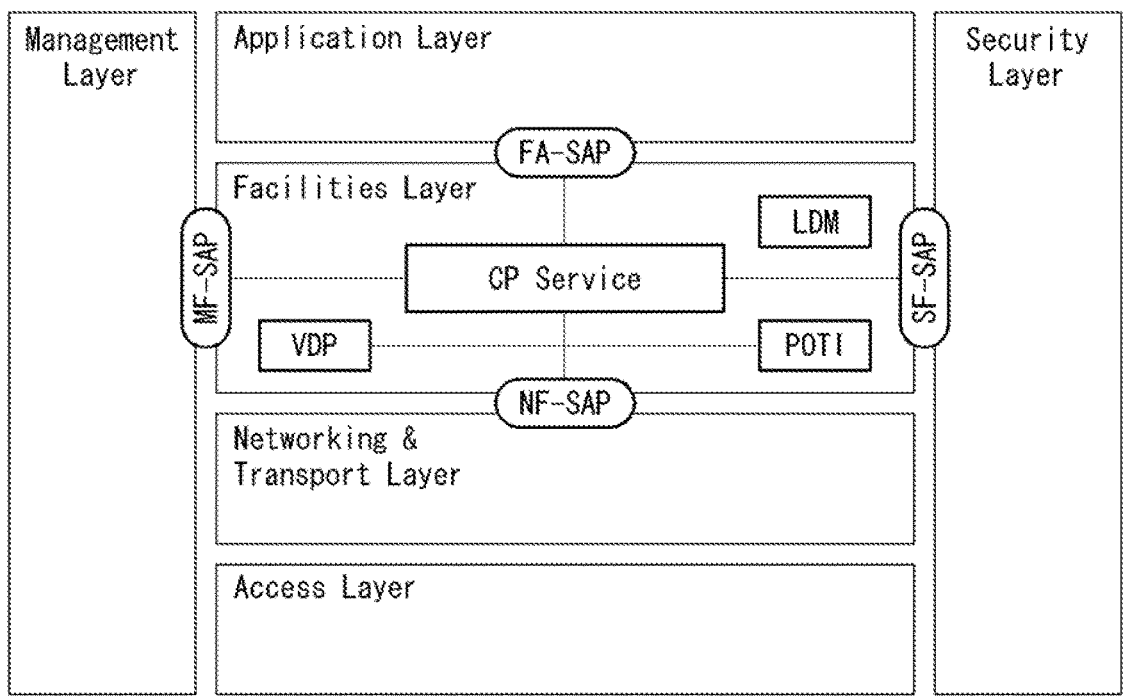

[FIG. 7]
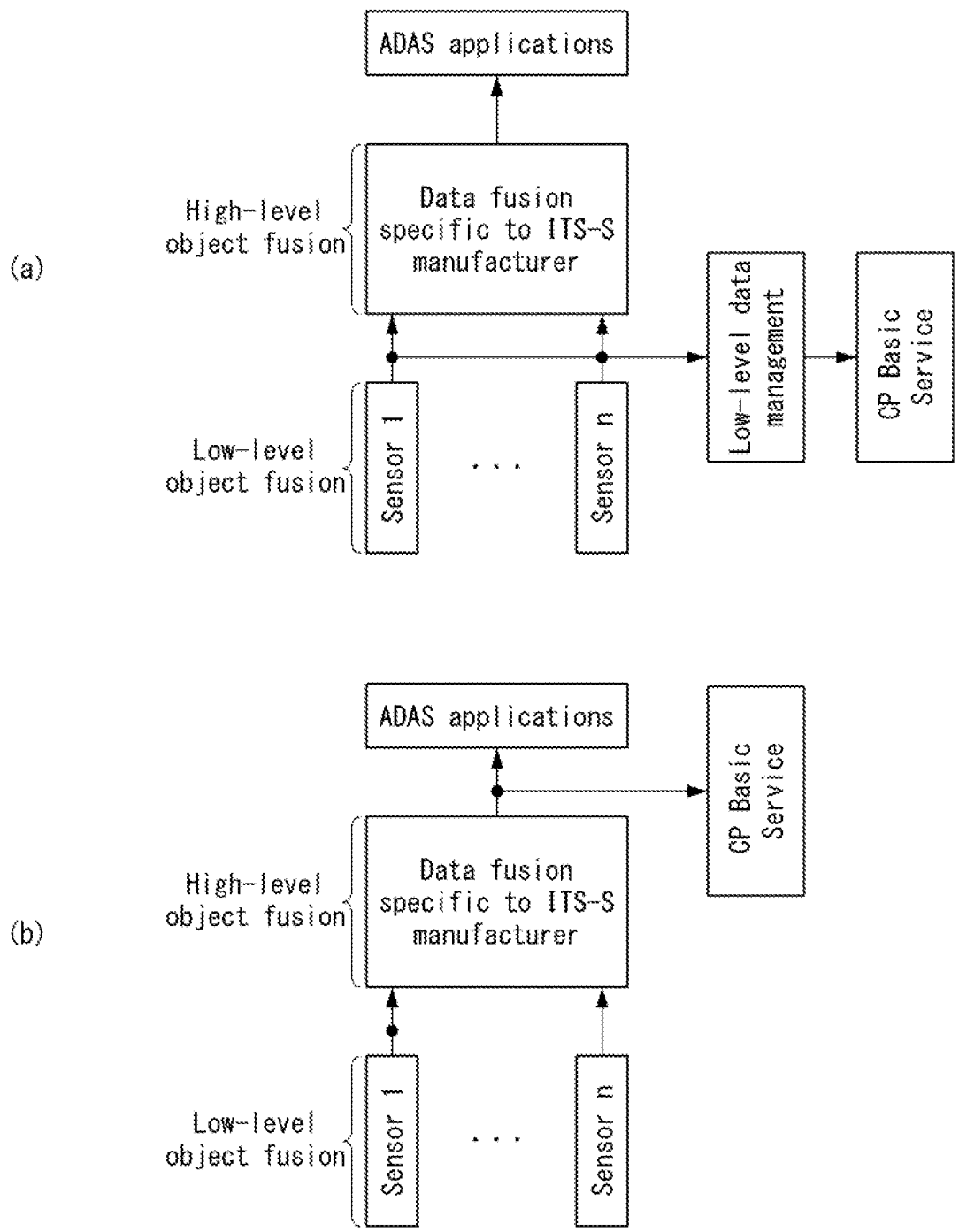

[FIG. 8]
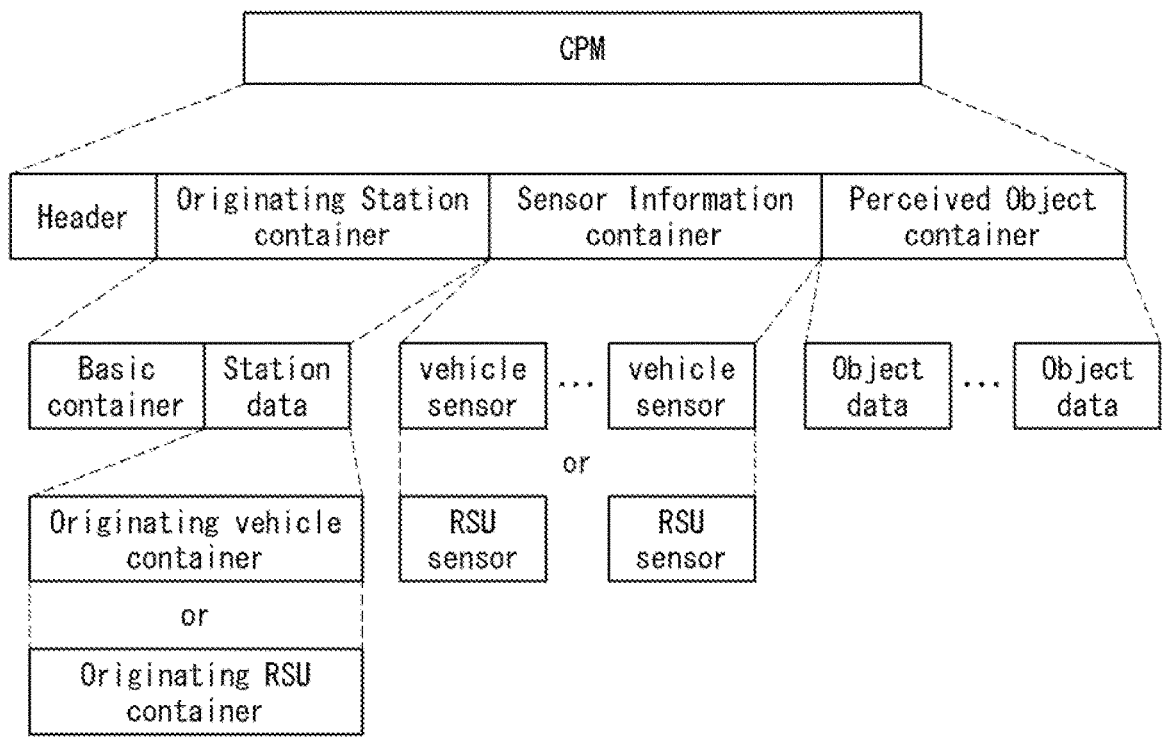
[FIG. 9]
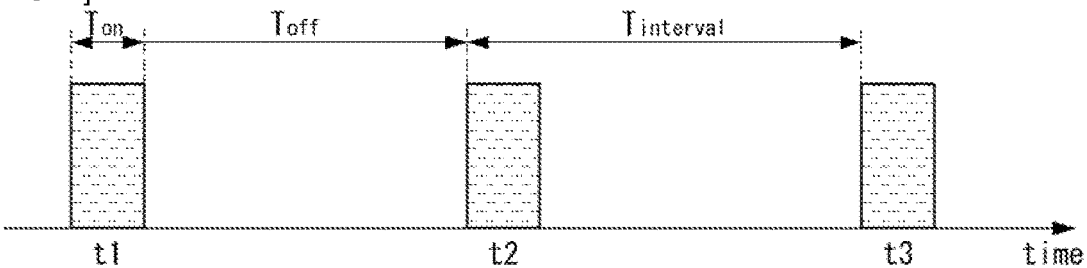
[FIG. 10]
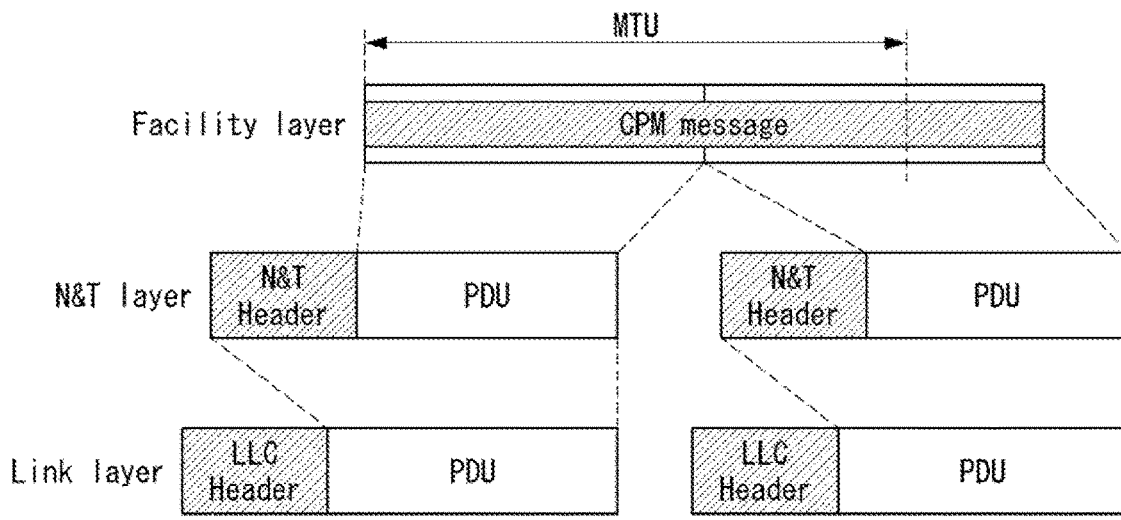

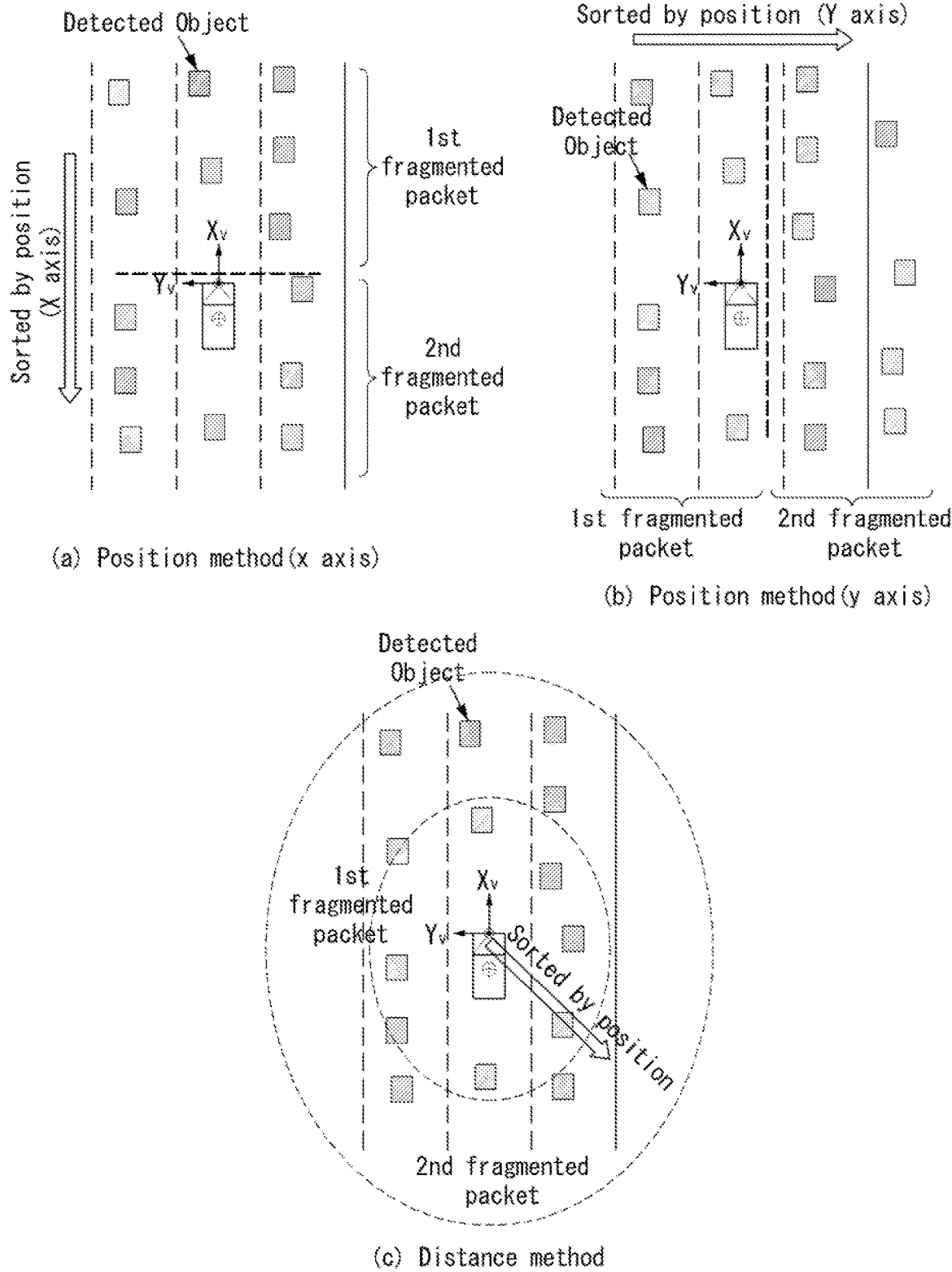
[FIG. 11]

[FIG. 12]
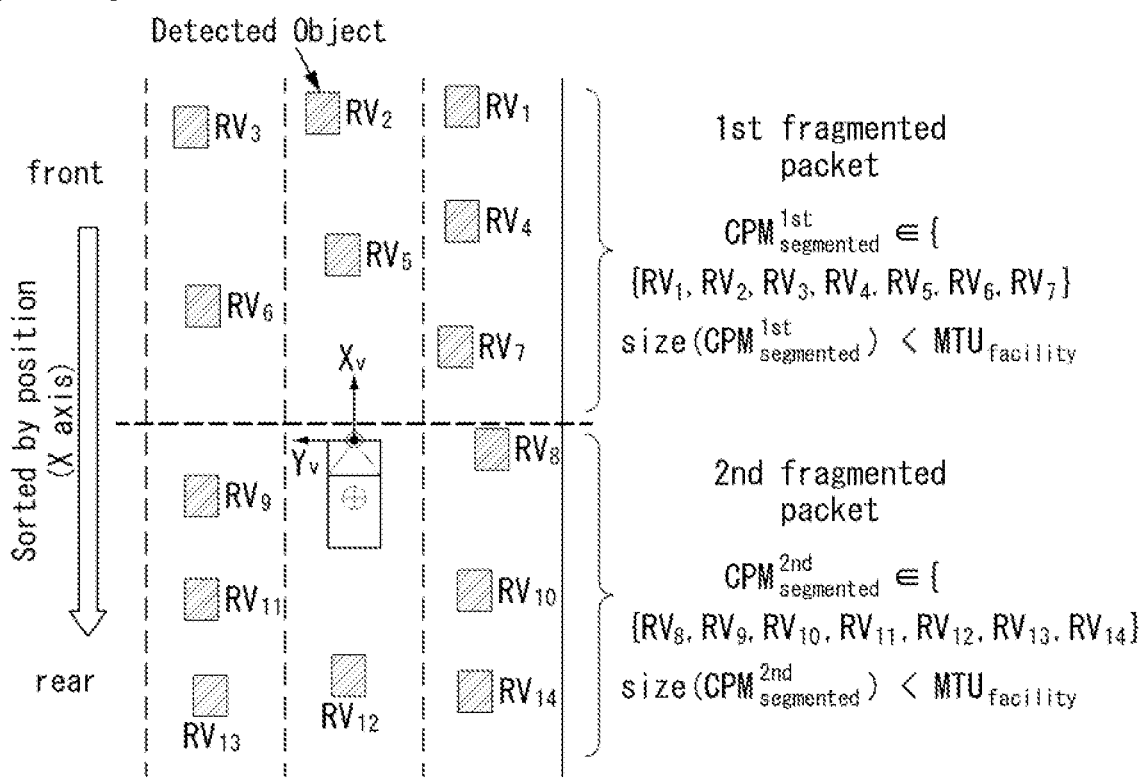

[FIG. 13]
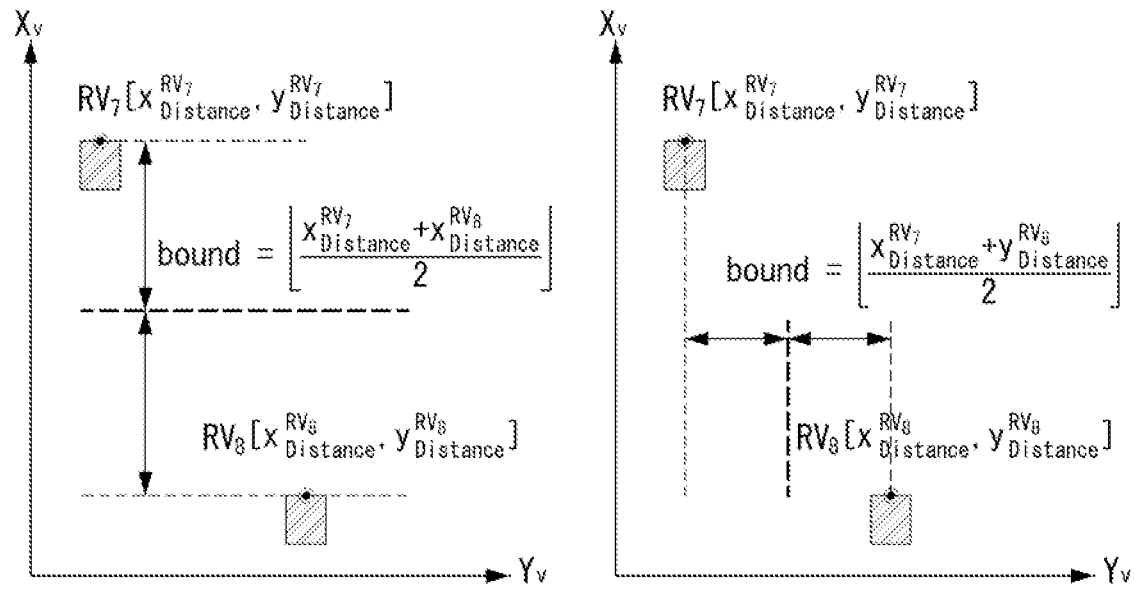
(a) Position sorting (x axis)  (b) Position sorting (y axis)
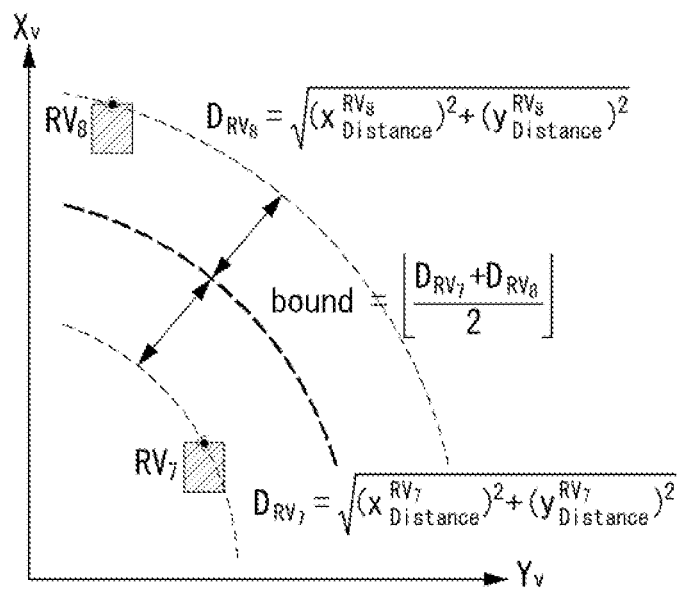
(c) Distance sorting

[FIG. 14]
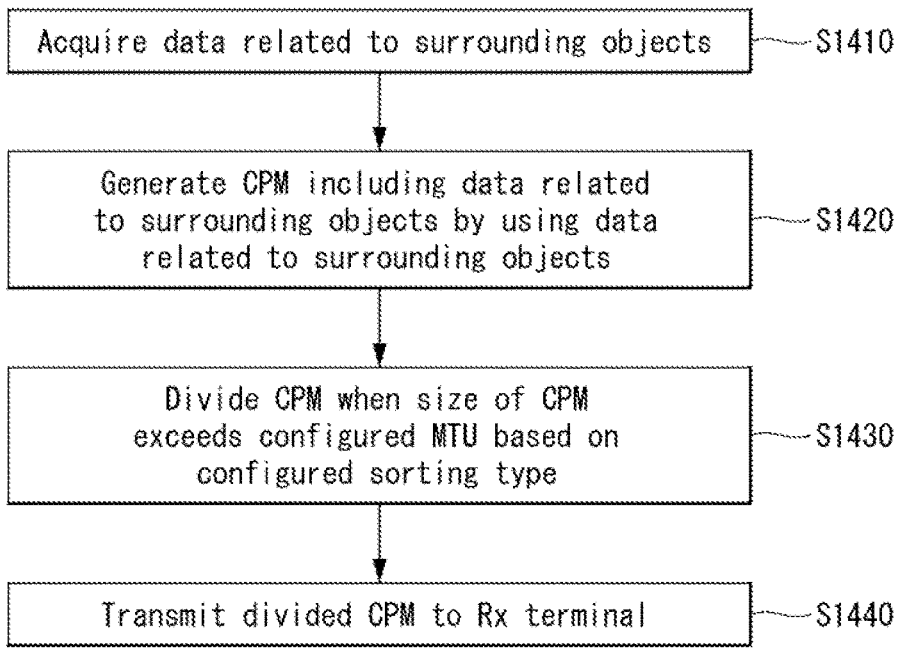
[FIG. 15]
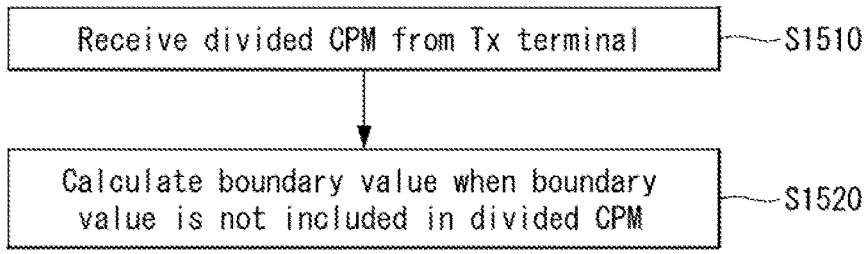
[FIG. 16]
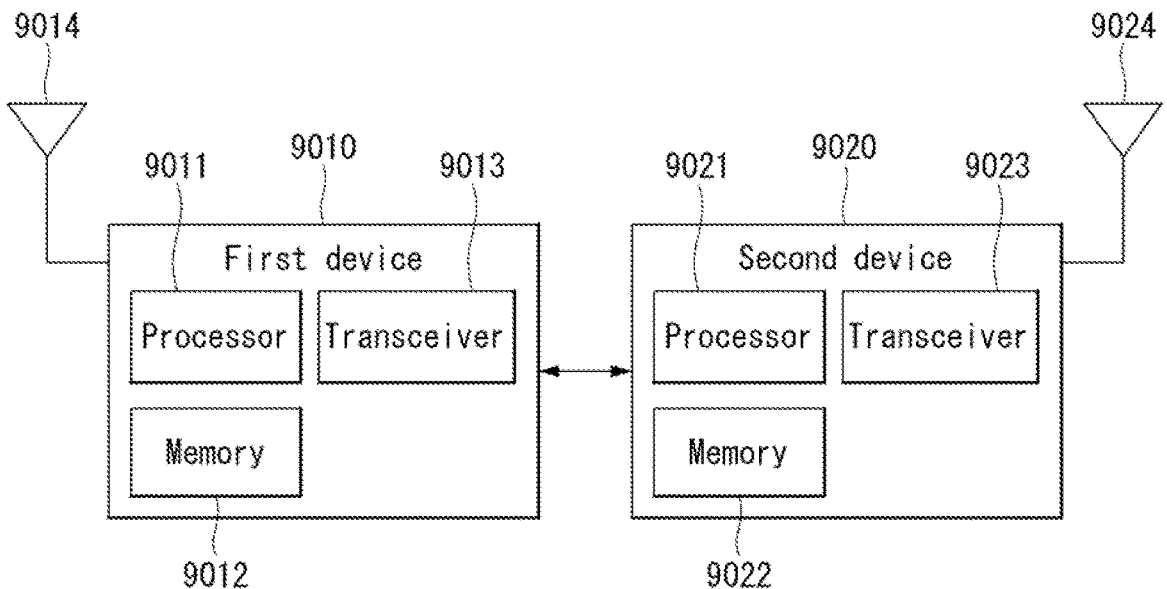

[FIG. 17]
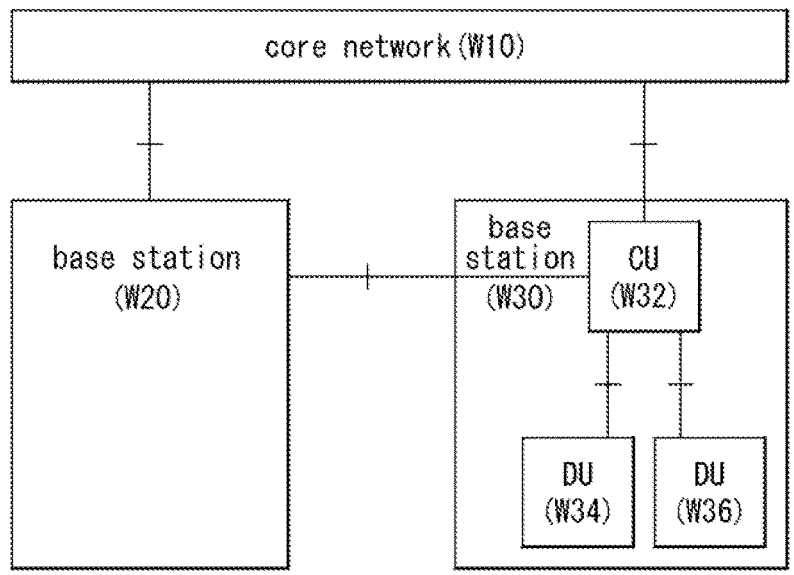
[FIG. 18]
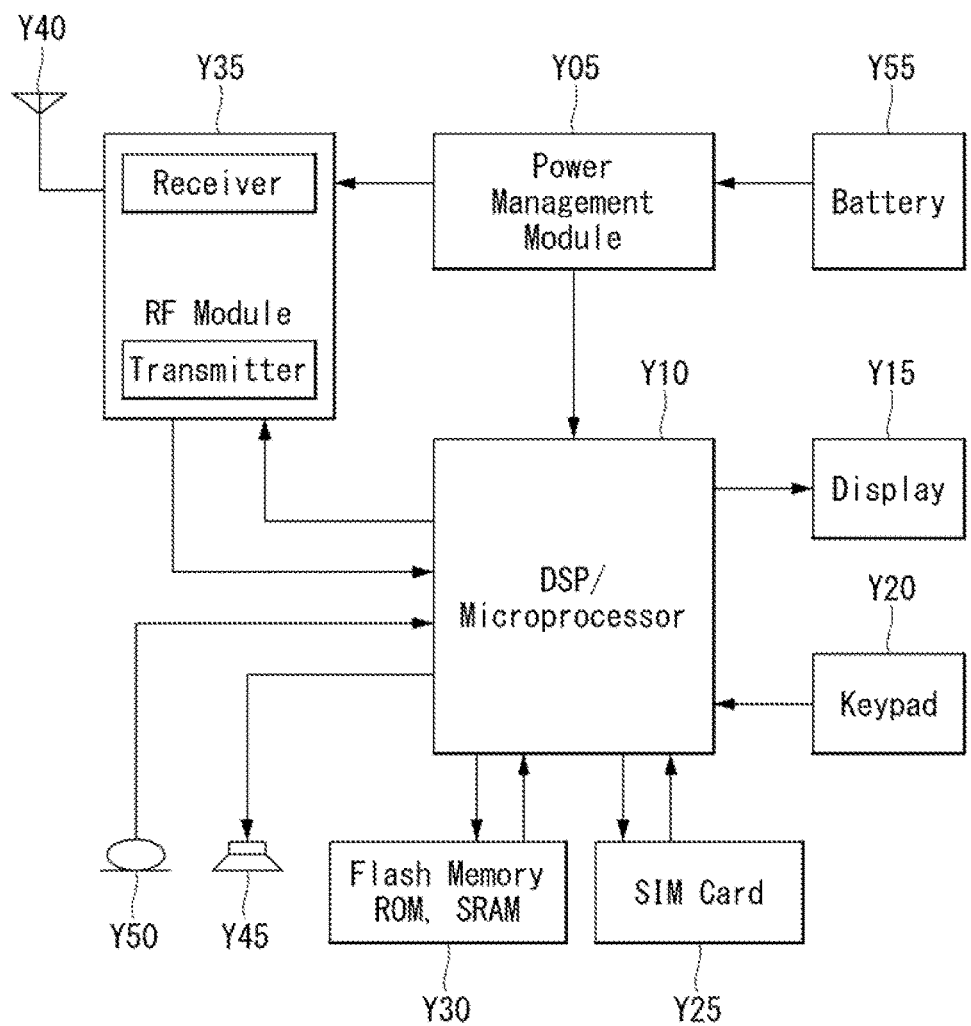

CPM MESSAGE DIVISION METHOD USING OBJECT STATE SORTING

CROSS-REFERENCE TO RELATED APPLICATIONS

This application is the National Stage filing under 35 U.S.C. 371 of International Application No. PCT/KR2020/000932, filed on Jan. 20, 2020, which claims the benefit of earlier filing date and right of priority to Korean Patent Application No. 10-2019-0006604, filed on Jan. 18, 2019, the contents of which are all incorporated by reference herein in their entirety.

TECHNICAL FIELD

The present disclosure relates to a collective perception technology for transmitting a state of a surrounding vehicle in order to supplement a CAM message that transmits only a state of its own vehicle, and more particularly, to an efficient operation of the corresponding technology and the development of a communication algorithm suitable for a V2X communication environment.

BACKGROUND ART

A vehicle departs from a machine engineering base and becomes the results of a complex industry technology in which electrical and electronic communication technologies are fussed. In this aspect, the vehicle is also called a smart car. A smart car will provide various user-customized mobile services in the future in addition to a vehicle technology having a traditional meaning, such as traffic safety/complicity solution by connecting a driver, a vehicle, traffic infra, etc. Such connectivity may be implemented using a vehicle to everything (V2X) communication technology. A system that provides the connectivity of a vehicle may be denoted as a connected vehicle system.

DISCLOSURE

Technical Problem

An object of the present disclosure is to provide a method of dividing a CPM message.

Furthermore, an object of the present disclosure is to provide a method of calculating a boundary value related to a divided CPM message.

Technical objects to be achieved by the present disclosure are not limited to the aforementioned technical objects, and other technical objects not described above may be evidently understood by a person having ordinary knowledge in the art to which the present disclosure pertains from the following description.

Technical Solution

An aspect of the present disclosure, in the CPM (Collective Perception Service Message) segmentation method of the first V2X communication device, the method comprises: acquiring data related to surrounding objects; generating a CPM including the data related to the surrounding objects by using the data related to the surrounding objects; diving the CPM, based on a sorting type which is configured in the first V2X communication device, when a size of the CPM exceeds a maximum transmission unit (MTU); and transmitting the divided CPM to a second V2X communication device, wherein the Sorting type is configured, based on the CPM, to partition an area where the surrounding objects are located by using location information of the surrounding objects calculated based on a location of the first V2X communication device.

Furthermore, wherein the dividing the CPM divides based on a virtual two-dimensional coordinate system having the location of the first V2X communication device as an origin.

Furthermore, wherein the dividing the CPM further comprises: arranging the data related to the surrounding objects based on the sorting type configured in the first V2X communication device.

Furthermore, wherein, based on a horizontal axis of the virtual two-dimensional coordinate system, the divided CPM includes (1) a first CPM including data related to objects located in an upper field of the horizontal axis and (2) a second CPM including data related to objects located in a rear field of the horizontal axis.

Furthermore, wherein, based on a vertical axis of the virtual two-dimensional coordinate system, the divided CPM includes (1) a first CPM including data related to objects located in a left field of the vertical axis and (2) a second CPM including data related to objects located in a right field of the vertical axis.

Furthermore, wherein, based on a distance value from the surrounding objects, the divided CPM includes (1) a first CPM including data related to objects located in an inner field of a configured boundary and (2) second CPM including data related to objects located in an outer field of the configured boundary.

Furthermore, wherein, based on the virtual two-dimensional coordinate system, the divided CPM includes a median value between a distance value from an X-axis of a first object located closest to the horizontal axis included in the first CPM and a distance value from an X-axis of a second object located closest to the horizontal axis included in the second CPM.

Furthermore, wherein, based on the virtual two-dimensional coordinate system, the divided CPM includes a median value between a distance value from a Y-axis of a first object located closest to the vertical axis included in the first CPM and a distance value from the Y-axis of a second object located closest to the vertical axis included in the second CPM.

Furthermore, wherein, based on the virtual two-dimensional coordinate system, the divided CPM includes a median value between a distance value from the origin of a first object located closest to the boundary included in the first CPM and a distance value from the origin of a second object located closest to the boundary included in the second CPM.

Another aspect of the present disclosure, A collective perception service message (CPM) segmentation method for a second V2X communication device, the method comprises: receiving a divided CPM from a first V2X communication device; and calculating a boundary value (boundValue) when the boundary value is not included in the divided CPM, wherein the divided CPM includes data related to objects located in a specific area configured based on a virtual two-dimensional coordinate system having the location of the first V2X communication device as an origin, and wherein the boundary value is related to a boundary of the specific area.

Furthermore, wherein the calculating a boundary value uses a distance value from an X-axis of the objects located in the specific area based on the virtual two-dimensional coordinate system.

Furthermore, wherein, when the specific area is configured as a field located at a top and furthest from the X-axis of the virtual two-dimensional coordinate system, the boundary value is calculated as a distance value from the X-axis of an object located furthest from the X-axis included in the specific area.

Furthermore, wherein, when the specific area is configured as a field located at a bottom and furthest from X-axis of the virtual two-dimensional coordinate system, the boundary value is calculated as a distance value from the X-axis of a object located furthest from the X-axis included in the specific area.

Another aspect of the present disclosure, in a V2X communication device for performing collective perception service message (CPM) segmentation, the V2X communication device comprises: a sensor; a transceiver; a memory; and a processor for controlling the sensor, the transceiver, and the memory, wherein the processor is configured to: acquire data related to surrounding objects through the sensor, generate a CPM including data related to the surrounding objects by using the data related to the surrounding objects, diving the CPM, based on a sorting type which is configured in the first V2X communication device, when a size of the CPM exceeds MTU (Maximum Transmission Unit), transmitting the divided CPM to a second V2X communication device through the transceiver, wherein the Sorting type is configured, based on the CPM, to partition an area where the surrounding objects are located by using location information of the surrounding objects calculated based on a location of the first V2X communication device.

Advantageous Effects

According to an embodiment of the present disclosure, a CPM message can be efficiently divided.

Furthermore, according to an embodiment of the present disclosure, a boundary value related to a divided CPM message can be calculated.

Effects which may be obtained in the present disclosure are not limited to the aforementioned effects, and other technical effects not described above may be evidently understood by a person having ordinary knowledge in the art to which the present disclosure pertains from the following description.

DESCRIPTION OF DRAWINGS

FIG. 1 illustrates a cooperative intelligent transport system according to an embodiment of the present disclosure.

FIG. 2 illustrates a trust message communication method of a V2X communication system according to an embodiment of the present disclosure.

FIG. 3 illustrates communication between V2X communication devices according to an embodiment of the present disclosure.

FIG. 4 illustrates a protocol stack of a V2X communication device according to an embodiment of the present disclosure.

FIG. 5 is an example of a CP Service to which the present disclosure may be applied.

FIG. 6 is an example of a CP service system to which the present disclosure may be applied.

FIG. 7 is an example of a connection structure of sensors and a CP service to which the present disclosure may be applied.

FIG. 8 is an example of a CPS message to which the present disclosure may be applied.

FIG. 9 is an example of a CPS message operation method to which the present disclosure may be applied.

FIG. 10 is an example of the division of a CPS message to which the present disclosure may be applied.

FIGS. 11 and 12 are embodiments of a message division method to which the present disclosure may be applied.

FIG. 13 is an example of BoundValue to which the present disclosure may be applied.

FIG. 14 is an embodiment of a division method for a Tx terminal to which the present disclosure may be applied.

FIG. 15 is an embodiment of a division method for a Rx terminal to which the present disclosure may be applied.

FIG. 16 illustrates a wireless communication device according to an embodiment of the present disclosure.

FIG. 17 exemplifies a block diagram of a network node according to an embodiment of the present disclosure.

FIG. 18 exemplifies a block diagram of a communication device according to an embodiment of the present disclosure.

The accompany drawings, which are included as part of the detailed description in order to help understanding of the present disclosure, provide embodiments of the present disclosure and describe the technical characteristics of the present disclosure along with the detailed description.

Mode for Invention

Preferred embodiments of the present disclosure are specifically described, and examples thereof are illustrated in the accompanying drawings. The following detailed description given with reference to the accompanying drawings is intended to describe preferred embodiments of the present disclosure rather than to describe only embodiments which may be implemented based on embodiments of the present disclosure. The following detailed description includes details in order to provide thorough understanding of the present disclosure, but the present disclosure does not require all such details. In the present disclosure, the following embodiments do not need to be separately used. A plurality of embodiments or all embodiments may be used together, and specific embodiments may be used as a combination.

Most of terms used in the present disclosure have been selected from common terms widely used in a corresponding field, but some terms have been randomly selected by the applicant and meanings thereof are described in detail in the following description, if necessary. Accordingly, the present disclosure should be understood based on an intended meaning of a term not the name or meaning of the term.

The present disclosure relates to a V2X communication device. The V2X communication device may be included in an intelligent transport system (ITS) system, and may perform some or all of functions of the ITS system. The V2X communication device may perform communication between a vehicle and a vehicle, a vehicle and infra, a vehicle and a bicycle, with a mobile device, etc. As an embodiment, the V2X communication device may correspond to an on board unit (OBU) of a vehicle or may be included in the OBU. The OBU may also be denoted as on board equipment (OBE). The V2X communication device may correspond to a road side unit (RSU) of infra structure or may be included in the RSU. The RSU may also be denoted as road side equipment (RSE). Alternatively, the V2X communication device may correspond to an ITS station or may be included in the ITS station. All of a given OBU, RSU, mobile equipment, etc. That performs V2X communication may also be denoted as ITS stations. Alternatively, the V2X communication device may correspond to a wireless access in vehicular (WAVE) apparatus or may be included in the WAVE apparatus. The V2X communication device may also be abbreviated as a V2X apparatus.

FIG. 1 illustrates a cooperative intelligent transport system according to an embodiment of the present disclosure.

A cooperative intelligent transport system (C-ITS) increases efficiency of traffic operation and management and improves user convenience and safety because information communication, control, and electronic technologies are added to the existing traffic system. In the cooperative intelligent transport system, transport infra systems, such as traffic lights and an electronic display board, in addition to a vehicle also perform V2X communication. Such infra structure may be abbreviated as an RSU as described above.

Referring to FIG. 1, in the cooperative intelligent transport system, a pedestrian device 1010, an RSU 1020, and vehicles 1030, 1040, and 1050 including V2X communication devices communicate with one another. As an embodiment, V2X communication may be performed based on the communication technology of IEEE 802.11p. A communication technology based on IEEE 802.11p may be denoted as dedicated short-range communication (DSRC). As an embodiment, V2X communication based on IEEE 802.11p may be a short-range communication technology having a range of about 600 m. V2X communication may broadcast a cooperative awareness message (CAM) or a decentralized environmental notification message (DENM).

The CAM is distributed in an ITS network, and provides information on at least one of the presence, position or communication state of an ITS station. The DENM provides information on a detected event. The DENM may provide information on a given driving situation or event detected by an ITS station. For example, the DENM may provide information on situations, such as an emergency electronic brake lamp, a vehicle accident, a vehicle problem, and a traffic condition.

In FIG. 1, the vehicle 1030 and the vehicle 1040 are present within communication coverage of the RSU 1020. However, the vehicle 1050 cannot directly communicate with the RSU because it is present out of communication coverage of the RSU 1020.

FIG. 2 illustrates a trust message communication method of a V2X communication system according to an embodiment of the present disclosure.

In the embodiment of FIG. 2, the V2X communication system may be a security system required for V2X communication devices (e.g., ITS stations or WAVE apparatuses) to safely transmit and receive messages for V2X communication. The V2X communication system may include one or more entities for the communication of a trusted message. For example, as illustrated, the V2X communication system may include a root certificate authority (root CA), an enrollment authority (EA), an authorization authority (AA) and/or at least one V2X communication device. As an embodiment, the V2X communication device may correspond to an OBE or may correspond to an RSE.

The root CA may provide the EA and the AA with a proof capable of issuing an enrollment confidential. The root CA may define rights and duties for the EA and the AA, may certificate the EA and the AA, and may check the execution of duties of the EA and the AA. As described above, the EA and the AA may be controlled by the root CA.

The EA is an entity responsible for lifecycle management of an enrollment confidential, and may certificate the V2X communication device and grant access to V2X communication. The EA may also be denoted as a long-term certificate authority. The EA may issue enrollment certificates (EC). The V2X communication device may have EC in order to certificate whether a sending V2X communication device is a suitable V2X sending apparatus. The EC may also be denoted as a long term certificate (LTC).

The AA is an entity responsible for issuing and using an authorization ticket (AT), and may provide the V2X communication device with an authoritative proof that may use a specific V2X service. The AA may also be denoted as a short-term certificate authority or a pseudonym certificate authority. The AA may issue an AT. The V2X communication device may have an AT in order for the V2X communication device to authenticate a received V2X message (e.g., a CAM or a DENM). The AT may also be denoted as a short-term certificate or a pseudonym certificate (PC).

The V2X communication device may acquire a right to access V2X communication from the EA, and may negotiate a right capable of invoking a V2X service from the AA. For example, the V2X communication device may request EC(LCT) from the EA, and may acquire the EC from the EA. Furthermore, the V2X communication device may request AT(PC) from the AA, and may acquire the AT from the AA. Furthermore, the V2X communication device may transmit and receive V2X messages. For example, the V2X communication device may perform the communication of a trust message with another V2X communication device by using EC and AT. Furthermore, the V2X communication device may forward a received V2X message to another V2X communication device. In the present disclosure, a V2X communication device that transmits a V2X message is denoted as a sending V2X communication device. A V2X communication device that receives a V2X message is denoted as a receiving V2X communication device. A V2X communication device that forwards a received V2X communication device to another V2X communication device is denoted as a relaying V2X communication device.

A method of performing, by V2X communication devices within a V2X communication system (security system) including the aforementioned entities, trust message communication is described in detail with reference to each drawing.

FIG. 3 illustrates communication between V2X communication devices according to an embodiment of the present disclosure.

In a connected vehicle system, V2X communication devices mounted on a vehicle, infrastructure, and a personalization device of a pedestrian may include the elements of the apparatus illustrated in FIG. 3.

In the embodiment of FIG. 3, the elements included in the V2X communication device of a vehicle are described as follows. The V2X communication device of the vehicle may include on board equipment (OBE). As an embodiment, the OBE may include a plurality of antenna systems and an OBE control process electronic control unit (ECU). Antenna system elements may be integrated or separately included, and may be included as a combination of some of them.

Global navigation satellite systems (GNSS) system: a satellite navigation system for calculating a location, elevation, speed of an object that moves all around the earth by using radio waves transmitted by artificial satellites. The GNSS may correspond to an antenna and a sub-system thereof for checking location information of a vehicle, which are included in the V2X communication device of the vehicle.

Dedicated short range communication (DSRC) radio sub system: an antenna and a corresponding sub-system for transmission/reception according to a DSRC protocol.

Cellular sub system: an antenna and a corresponding sub-system for cellular data communication.

Broadcasting sub system: an antenna and a corresponding sub-system for transmitting/receiving broadcast data.

OBE control process ECU: the OBE control process ECU may be abbreviated as a controller or a processor. The controller may process data messages received from a plurality of heterogeneous systems, and may perform a proper operation by controlling other ECUs within a vehicle. The controller may execute an application for such data processing and vehicle control/driving. Furthermore, the controller may process sending data received from another electronic equipment or the sensors within a vehicle, and may transmit the data to external V2X communication devices/vehicles. As an embodiment, all types of information within a vehicle may be converted into a standardized format which may be shared through the controller. As in FIG. 3, a safety application is executed, so that information can be transmitted and received to and from buses, such as a CAN within a vehicle, Ethernet, etc. Furthermore, information may be provided to a user through a driver vehicle interface (DVI), such as an audio or display of a vehicle.

The V2X communication device configured as described above may communicate with support systems, such as infrastructure, a pedestrian and a cloud/server, in addition to another vehicle.

Furthermore, in the embodiment of FIG. 3, elements included in the V2X communication device of infrastructure are described as follows. The V2X communication device of infrastructure may include road side equipment (RSE). The RSE, like the OBE of a vehicle, may include a plurality of antenna systems and a controller (processor). Antenna system elements may be integrated or separately included, and may be included as a combination of some of the elements. Meanwhile, the controller of the RSE may perform an operation identical with or similar to that of the controller of the OBE. For example, the controller of the RSE may process data messages received from a plurality of heterogeneous system, and may perform a proper operation by controlling other ECUs within infrastructure.

The RSE may communicate with a vehicle by receiving information of a traffic controller. The RSE may be a fixed apparatus, and may operate as a provider with a backend connected thereto. However, in some embodiments, the RSE may collect information from a vehicle and transmit the information again, and thus may operate as a user apparatus in addition to a provider apparatus.

Furthermore, in the embodiment of FIG. 3, elements included in a V2X communication device of a personalization device (VRU apparatus) of a pedestrian are described as follows. The V2X communication device of the VRU apparatus may include a plurality of antenna systems and a controller (processor). Antenna system elements may be integrated or separately included, and may be included as a combination of some of the elements. Meanwhile, the controller of the VRU apparatus may perform an operation identical with or similar to that of the controller of the OBE. For example, the controller of the VRU apparatus may process data messages received from a plurality of heterogeneous systems, and may perform a proper operation by controlling other ECUs within a personalization device. Furthermore, the controller may execute an application for such data processing and the control/driving of the personalization device. Furthermore, the controller may process sending data received from another electronic equipment or the sensors within the personalization device, and may transmit the data to an external V2X communication devices. As in FIG. 3, the safety application is executed, so that information can be transmitted and received to and from the personalization device. Furthermore, information may be provided to a user through VRU interfaces, such as the audio and display of the personalization device.

As illustrated in FIG. 3, communication between vehicles may be denoted as V2V communication. Communication between a vehicle and infra structure may be denoted as V2I communication or I2V communication. Communication between a vehicle and a personalization device of a pedestrian may be denoted as V2P communication or P2V communication. For example, communication between vehicles using DSRC may be denoted as DSRC V2V communication. Communication between a vehicle and infra structure using DSRC may be denoted as DSRC V2I communication or DSRC I2V communication. Communication between a vehicle and a personalization device of a pedestrian using DSRC may be denoted as DSRC V2P communication or DSRC P2V communication. Meanwhile, communication between a vehicle and another V2X communication device may be generally called V2X communication. Communication between a V2X communication device and another V2X communication device may be generally called X2X.

FIG. 4 illustrates a protocol stack of a V2X communication device according to an embodiment of the present disclosure. Specifically, FIG. 4 illustrates a protocol stack of a V2X communication device in the United States (US) or Europe (EU) according to an embodiment of the present disclosure.

The V2X communication devices illustrated in FIG. 3 may communicate with one another by using the communication protocol illustrated in FIG. 4 for V2X communication.

Layers included in FIG. 4 are described as follows.

Application layer: an application layer may implement and support various use cases. For example, the application may provide road safety, efficient traffic information, and other applications.

Facilities layer: a layer corresponding to the OSI layer 5 (session layer), the layer 6 (presentation) layer, and the layer 7 (application layer). The facilities layer may support various use cases defined in the application layer so that the use cases can be effectively realized. For example, the facilities layer may provide an API for encoding/decoding a message for supporting the application layer. As an embodiment, the message may be encoded/decoded by the ASN.1 method.

A service and message set provided in the facilities layer is regulated by Society of Automotive Engineers (SAE) in US, and is regulated by ETSI ITS in EU. For example, in the case of US, a basic safety message (BSM) message for supporting a basic safety application, an emergency vehicle alert (EVA) message, MAP (MapData) for supporting an intersection safety application, signal phase and timing (SPAT), an intersection collision alert (ICA) message, roadside alert (RSA) for supporting a traveler information application, a traveler information message (TIM) message, etc. may be provided as the message set. In the case of Europe, a cooperative awareness message (CAM), a decentralized environmental notification message (DENM) message, etc. may be provided as the message set.

Networking & transport layer: a layer corresponding to the OSI layer 3 (network layer) and the layer 4 (transport layer). The networking & transport layer may configure a network for vehicle communication between homogenous/heterogeneous networks by using various transport protocols and network protocols. For example, the networking & transport layer may provide Internet access and routing using an Internet protocol, such as TCP/UDP+IPv6. Alternatively, the networking & transport layer may configure a vehicle network by using a geographical position-based protocol, such as a basic transport protocol (BTP)/geonetworking. Alternatively, the networking & transport layer may configure a vehicle network by using a WAVE short message protocol) (WSMP) (e.g., WSMP-N and WSMP-T).

Furthermore, the networking and transport layer may provide advertisement for provided services. For example, in the case of US, such advertisement may be provided through WAVE service advertisement (WSA). In the case of EU, such advertisement may be provided through a service announcement message (SAM).

Access layer: a layer corresponding to the OSI layer 1 (physical layer), the layer 2 (data link layer). The access layer may transmit a message/data received from a higher layer through a physical channel. For example, the access layer may perform/support data communication based on at least one of the IEEE 802.11 and/or 802.11p standard-based communication technology, the WIFI physical transmission technology of the IEEE 802.11 and/or 802.11p standard, a DSRC technology, a 2G/3G/4G(LTE)/5G wireless cellular communication technology including satellite/wideband wireless mobile communication, a global positioning system (GPS) technology, Bluetooth, or the IEEE 1609 WAVE technology. Meanwhile, in the case of US, in order to support communication in a vehicle environment, then MAC technology based on the IEEE 1609.4 standard is supplemented and used.

Security layer: a layer for data trust and privacy. The security layer may provide an authentication and encryption function for guaranteeing privacy. The authentication is used to indicate whether a sender is a valid V2X communication device having a right and to indicate whether transmitted data has not been changed. The encryption is used to maintain the secret of data. As an embodiment, a message or data generated in the networking & transport layer may be secured and transmitted or may be non-secured and transmitted through the security layer depending on its type.

Management layer: the management layer may provide multi-channel decentralized congestion control (MDCC). Furthermore, the management layer may generate content for service advertisement based on information received from a higher layer. The content may include IP configuration information and security credential information. Furthermore, the management layer may monitor received service advertisement, and may determine a channel allocation/switching schedule by estimating channel quality.

Collective Perception Service

A CAM is a technology that helps a vehicle in which a V2X module has been installed to perform more stable driving by periodically forwarding its position and state to a surrounding V2X vehicle. However, such a method has limitations in which only information of a vehicle in which a V2X module has been installed is shared. In order to supplement and improve the limitations, a collective perception service (CPS) technology is developed. As vehicles on which the ADAS technology has been mounted are recently increased, many vehicles have sensors, such as a camera, a radar, and a Lidar, mounted thereon, and perform a function of recognizing surrounding vehicles and performing driving driver assistance. The CPS technology is a technology in which an ADAS notifies surroundings of recognized sensor data of surrounding environments through V2X communication.

FIG. 5 is an example of a CP Service to which the present disclosure may be applied.

Referring to FIG. 5, a TxV1 vehicle having a CPS function may recognize RV1 to RV11 vehicles, that is, surrounding objects that enter a sensor radius, through the ADAS sensor technology. The obtained object information may be forwarded to surrounding vehicles on which V2X receivers have been mounted through V2X communication. Furthermore, through the obtained CPS message information, RxV1 vehicles not having the sensors may acquire information of following vehicles, and the vehicle of an RxV2 on which the sensor has been mounted may acquire information of an object out of coverage of its sensor or positioned in a blind spot.

FIG. 6 is an example of a CP service system to which the present disclosure may be applied.

Referring to FIG. 6, an ITS system provides a corresponding technology through a CP service in the facilities layer. The CP service is present within the facilities layer, and enables services within the facilities layer to be used. A local dynamic map (LDM) is a service that provides a map, and is provided with map information for a CP service. A position and time (POTI) is a service that provides a position and time of a vehicle, and uses corresponding information. A vehicle may be provided with its own position and accurate time. A vehicle data provider (VDP) is a service that provides information of a vehicle, and a vehicle may transmit information, such as the size of the vehicle, by carrying the information on a CPM.

Many sensors, such as a camera, an infrared sensor, a radar, and a Lidar, are mounted on an ADAS vehicle for driver driving assistance. The sensors may distinguish between objects. Furthermore, through a data fusion block, sensor data may be collected, fused and provided to an ADAS application.

FIG. 7 is an example of a connection structure of sensors and a CP service to which the present disclosure may be applied.

Referring to FIG. 7, a method of collecting sensor information in the existing ADAS for a CP service is described. The existing sensor for ADAS or sensor for CPS always tracks a surrounding object and collects corresponding data. Two methods using a sensor value are present for a CPS service. Referring to FIG. 7(a), a vehicle may process a value of each sensor and provide the value to a surrounding vehicle through a CP service. In a corresponding method, the amount of data transmitted through V2X is increased because a value of each sensor is transmitted, but a receiving system can efficiently use information of each sensor. Referring to FIG. 7(b), this method has a structure in which a vehicle provides sensor information collected and integrated into one through a CP service after a data fusion block. This method has an advantage in that the size of a CPM message transmitted through V2X is reduced, but has a disadvantage in that this method depends on a collection method of a vehicle for collecting sensor information.

Collective Perception Services (CPS) Message Structure

In order to provide a CP service, a CPM message capable of forwarding sensor information requires a new design. In the present disclosure, a CPM message is interchangeably used with a CPS message or a CPM, and a V2X message or a message may include a CPM message.

FIG. 8 is an example of a CPS message to which the present disclosure may be applied.

Referring to FIG. 8, a configuration of a currently proposed CPM message basically consists of a header, OriginatingStationContainer (OSC), SensorInformationContainer (SIC), and PerceivedObjectContainer (POC).

The header consists of "protocolVertion", "messageID", "stationID", and "generationDeltaTime." Such functions illustrate a version of a protocol, an ID for identifying a message, an ID for identifying a station, and the time when a message was generated.

The OSC has a function for transmitting its own vehicle information, and has corresponding "StationData" suitable for a vehicle and an RSU depending on a station. Originating station information that is necessary in common is present in "BasicContainer." "basicContainer" of the OSC consists of "referencePosition" that provides notification of a reference position of a CPM vehicle and "stationType" that provides notification of the type (vehicle or RSU) of a station. OSC StationData is differently defined depending on stationType. When stationType is a vehicle, OSC StationData has "OriginatingVehicleContainer", and consists of "Heading", "Speed", "OrientationDeltaAngle", "driveDirection", "Acceleration", and "trailerData." Each function forwards a driving direction and driving speed of a vehicle, an angle between a driving direction of the vehicle and the front of the vehicle, acceleration of the vehicle, and information of a trailer. When stationType is an RSU, OSC StationData consists of "intersectionReferenceID" and "RoadSegmentationID". Each message includes information on an ID for identifying an intersection and an ID of a road, and provides notification of information of the RSU.

The SIC has a function for forwarding installation/function information of a sensor used to detect an object, and has a corresponding number depending on the number of vehicle sensors or RSU sensors installed depending on the type of station. A VehicleSensor message consists of SensorID to identify a sensor, SensorType providing notification of the type of a sensor, offset information (indicated as an offset based on xOffset, yOffset, zOffset, referencePosition) for providing notification of a position where a sensor is installed, and data providing notification of a measurement range (range, horizontalFrustumStart/End, verticalFrustumStart/End, a measurement distance, a horizontal measurement range, a vertical measurement range) of a sensor. The StationSensor message consists of SensorID to identify a sensor, offset information (indicated as an offset based on xOffset, yOffset, zOffset, referencePosition) for providing notification of a position where a sensor is installed, and data providing notification of a measurement range (range, horizontalFrustumStart/End, verticalFrustumStart/End, a measurement distance, a horizontal measurement range, a vertical measurement range) of a sensor.

The POC is data consisting of information of a surrounding object collected through a sensor. Each "ObjectData" is generated based on the number of measured objects. For example, if four objects are measured, four object data is present within the POC. A configuration of ObjectData includes "ObjectID" for identifying an object, data ("SensorID", "TimeOfMeasurement") providing notification of a sensor and time used for measurement, position information (illustrates "xDistance", "yDistance", "zDistance"; x, y, and z distances in "referencePosition") of a measured object, motion information ("xSpeed", "ySpeed", "zSpeed", "xAcceleration", "yAcceleration", "zAcceleration"; a speed in the x, y, and z axis provides notification of a speed) of an object, and size information ("planarObjectDimension1", "planarObjectDimension1", "verticalObjectDimension"; provide notification of size and height values in a horizontal plane of an object) of an object, stateinformation ("classification", "lanePosition", "intersectionTopologyPositoin"; an object vehicle type, lane information of an object, intersection location information of an object) of an object.

Collective perception services (CPS) message operation/transmission method

For a CPS service, a V2X vehicle continues to track a surrounding object based on sensor information and internally manages a position and state of an object. The V2X vehicle generates a CPM message by using information of the vehicle and information of a tracked object in a corresponding time based on its message transmission cycle. The generated message passes through the network&transport layer and the access layer, thus generates a V2X packet. Object information sensed in a vehicle that provides a CPS service through an RF module is transmitted to a surrounding V2X vehicle.

FIG. 9 is an example of a CPS message operation method to which the present disclosure may be applied.

Referring to FIG. 9, a data format of a CPS message transmitted in an RF channel is as follows. When a transmission cycle related to a generated message is reached, a vehicle transmits a V2X message in a subsequent time (time t1). The time when the message is transmitted is $T_{on}$, and may mean the time during which the channel is occupied. If the number of sensors is increased or the number of sensed objects is increased, the size of a CPS message is increased, and a value of $T_{on}$ may be increased in proportion thereto. The V2X message is periodically transmitted. For example, the V2X message may be transmitted in the time t1. Thereafter, a message including newly updated object information may be transmitted in times t2 and t3. Such a transmission cycle of the message has a value of $T_{interval}$. The corresponding value is fixed, but the transmission cycle may be adjusted based on a channel load if the DCC technology is applied.

Message Division Scheme for CPS

Need to increase message size and divide message based on CPS characteristic

A V2X message generated in the facility layer may be forwarded as a PDU of the Networks and Transport layer through the N&T layer. The protocol of the corresponding layer uses a GeoNet & BTP protocol in EU and uses a WSMP protocol in US. As described above, the V2X message may be forwarded as a PDU of the link layer to which an N&T header has been attached through the N&T layer. The link layer may generate a link layer packet by attaching a link layer header to the PDU received from the upper layer. The link layer packet is transmitted to DSRC-WAVE (IEEE 802.11P), that is, the access layer.

A maximum transmittable size of a packet which may be processed in DSRC-WAVE does not exceed a maximum transmission unit (MTU, $MTU_{AL}$) value defined in the access layer. In the link layer, a PDU size except the header size of the link layer in an MTU defined in a lower layer becomes an MTU ($MTU_{NT}$) of the N&T layer. An MTU ($MTU_{facility}$), that is, a maximum permissible size of a message of the facility layer is defined by considering a value except the header of the N&T layer in the MTU defined in the lower layer or a maximum processing size which may be processed in the N&T layer. As described above, a message generated in the facility layer should not exceed the MTU. Messages, such as the existing CAM and DENM, are messages for transmitting a state and event of its own vehicle, and may be configured not to exceed $MTU_{facility}$ although all of optional data is transmitted.

In contrast, the size of a CPS message is flexibly changed depending on the number of sensors and the number of sensed objects. In a system providing CPS, a maximum number of 10 sensors may be represented, and a maximum number of 20 objects may be represented. Furthermore, a data size is changed depending on whether message data, such as an option, is used. As technologies for an ADAS vehicle or autonomous vehicles are advanced in the future, the number of sensors in the vehicle is increased, and the number of sensed objects is increased due to the improvement of performance of sensors. Furthermore, the size of a message to which functions are added for a CPS service and which is transmitted may be increased due to an increase of the number of sensors and an increased of an autonomous driving level.

If the size of a CPS message is increased and becomes greater than $MTU_{facility}$, the CPS message needs to be divided.

FIG. 10 is an example of the division of a CPS message to which the present disclosure may be applied.

FIG. 10 diagrams a method of dividing and transmitting a CPS message when the size of the CPS message exceeds $MTU_{facility}$. The CPS message is divided into two messages in the facility layer. Each of the divided two messages generates packets in the N&T layer and the link layer, respectively, while going down to the layers.

The present disclosure exemplifies a method of dividing a CPS message.

In the existing TCP/IP, an Ack/Nack method is present. A message is divided to an MTU or less in the Network & Transport layer. An Rx terminal receives all divided messages based on indices of their headers and CRC, recombines the divided messages, and forwards the message to an upper layer. However, in the case of V2X communication, communication for an Ack/Nack structure is impossible and retransmission cannot be requested. If divided messages are recombined in the Rx terminal or a divided message is omitted, a message cannot be retransmitted. Furthermore, V2X communication is a technology that handles the safety and life of a driver and requires a real-time property for the transmission and reception of a message.

2. CPS Message Division Method in Object Unit

The size of a CPS message is flexibly changed depending on the number of sensors and the number of sensed objects. However, a CPS message generated in the facility layer should not exceed an MTU. If the size of the CPS message is increased and becomes greater than $MTU_{facility}$, the CPS message needs to be divided. Furthermore, in terms of a vehicle communication characteristic, a divided CPS message needs to be immediately used. To this end, the message needs to be decoded, and information of an object needs to be obtained even without collecting divided messages. To this end, a POC container may be divided in an object data unit.

2.1 Object Sorting Method for POC Division

CPS messages are arranged based on a state of an object and then divided. A method of arranging CPS messages includes an arrangement method based on a state of an object and an arrangement method based on a zone. The arrangement method based on a state of an object is a method of arranging CPS messages in order of faster speed and including fast objects in the first division message for rapid transmission. The arrangement method has an advantage in that a CPS message can be transmitted by considering a degree of confidence of speed if degrees of confidence in addition to the speed are also multiplied and arranged. Such a method may also be used for other features, such as acceleration, in addition to the speed. This method enables fast transmission, but has a disadvantage in that all of HV surrounding situations cannot be recognized until all divided messages are received.

FIGS. 11 and 12 are embodiments of a message division method to which the present disclosure may be applied.

Referring to FIG. 11, the arrangement method based on a zone is a method of classifying CPS messages based on a zone depending on a detected position of an object included in a CPS message, and can remove the ambiguity state of an object attributable to message division. That is, an Rx terminal can be aware of a state of an object included in a defined area and whether an object is present although it receives only one divided segmented message. A sorting method based on the zone-based method includes a position (X axis, Y axis) method and a distance method. In a division method based on a position, positions of objects are sorted based on their vehicles. Referring to FIG. 11(a), a Tx terminal may arrange packets in descending order based on a vehicle forward direction if division is performed in the X axis. Furthermore, referring to FIG. 11(b), a Tx terminal performs division from left to right if the division is performed in the Y axis. Referring to FIG. 11(c), a Tx terminal arranges and sorts distances from the Tx terminal from close ranking to distant ranking from if sorting is performed based on distances.

Referring to FIG. 12, as a result of measurement of an object using a sensor, when a CPS message including information of RV1-RV14 is transmitted, a message exceeding an MTU needs to be divided. If a message is divided in the X axis, a Tx terminal arranges estimated X_distance values of objects in descending order and divides the message. The objects are arranged in order from RV1 to RV14 based on the X_distance values and are divided into a size satisfying the MTU. More specifically, the first message of the divided messages may be transmitted from RV1 to RV7, and the second message of the divided messages may be transmitted from RV8 to RV14.

The sorting method is determined in SortingType of "PercevedObjectContainerSegmentInfo."

Table 1 is an example of DataElement of a sorting type.

TABLE 1

| Descriptive Name | SortingType |
|---|---|
| ASN.1 representation | SortingType ::= INTEGER {Speed(1), SpeedAndConfidence(2), Acceleration(3), AccelerationAndConfidence(4), PositionXaxis(5), PositionYaxis(6), Distance(7)} (0 . . . 15) |
| Definition | Describes the type of segmentation. The following types are defined: Speed(1), SpeedAndConfidence(2), Acceleration(3), AccelerationAndConfidence(4), PositionXaxis(5), PositionYaxis(6), Distance(7) |
| Unit | N/A |

Referring to Table 1, the sorting type consists of INTEGER. When a value of the integer is (1), this means a sorting mode based on speed. When a value of the integer is (2), this means a sorting mode based on a value obtained by multiplying speed by confidence. When a value of the integer is (3) or (4), this means a sorting mode based on acceleration. When a value of the integer is (5), (6), or (7), this means a sorting mode based on a zone. (5) is an arrangement mode in the X axis direction. (6) is an arrangement mode in the Y axis direction. (7) means an arrangement mode in order of distance closer to a Tx terminal.

2.2 Method of Acquiring and Transmitting Bound Information of Object Group

A Tx terminal may generate a zone through a message sorted, divided and transmitted as described above. When a message is generated based on a zone, information on all objects within the zone may be transmitted. An Rx terminal may immediately use the information for autonomous driving data processing. A method of obtaining a bound includes a method of extracting bounds from objects of OIC and a method (optional) of transmitting bound information.

In the method of extracting a zone from objects, higher and lower x_Distance values among values present in a message become an upper bound and lower bound of the zone. If a divided message is the first packet (1/n), the upper bound may become a field of view (FoV). If a divided message is the last packet (n/n), the lower bound may become a field of view (FoV).

If a more accurate expression is required, a Tx terminal may use a method of transmitting bound information in a message. That is, a vehicle additionally transmits the bound of a zone. The bound of the zone may have a middle value between two objects in the bound of the zone. For example, in order to remove a decimal point value included in the bound, the Tx terminal may perform round processing.

Equations 1 to 3 are examples of equations for determining BoundValue when a message is divided between RV7 and RV8.

$$boundValue_{xAxis} = \left\lfloor \frac{x_{Distance}^{RV_7} + x_{Distance}^{RV_8}}{2} \right\rfloor \quad \text{[Equation 1]}$$

$$boundValue_{yAxis} = \left\lfloor \frac{y_{Distance}^{RV_7} + y_{Distance}^{RV_8}}{2} \right\rfloor \quad \text{[Equation 2]}$$

$$boundValue_{Distance} = \left\lfloor \frac{D_{RV_7} + D_{RV_8}}{2} \right\rfloor \quad \text{[Equation 3]}$$

Furthermore, two objects may have different confidence values. More specifically, a value obtained by adding the confidence values of the two objects may be used as DistanceConfidence of a bound.

Equation 4 is an example of an equation that determines DistanceConfidence.

$$boundConfidence = PositionConfidence_{RV_7} + PositionConfidence_{RV_8} \quad \text{[Equation 4]}$$

FIG. 13 is an example of BoundValue to which the present disclosure may be applied.

Referring to FIG. 13, a data frame (DF) uses a distance.

Table 2 is an example of a distance configuration. The distance is a DF that is conventionally present, and is configured like Table 2.

TABLE 2

| Descriptive Name | Distance |
|---|---|
| ASN.1 representation | Distance ::= SEQUENCE { value DistanceValue, confidence DistanceConfidence } |
| Definition | A general Data Frame (DF) to describe a distance component along with a confidence with a predefined confidence level of 95% for the component. The DF shall include the following information: |

TABLE 2-continued

| Descriptive Name | Distance |
|---|---|
| | value: The distance value which can be estimated as the mean of the current distribution. It shall be presented as specified in clause C.16 DE_DistanceValue. confidence: The confidence value associated to the provided value. It shall be presented as specified in clause C.17 DE_DistanceConfidence. |
| Unit | N/A |

The DF includes a value (distanceValue) indicative of a distance and confidence (distanceConfidence) indicative of a degree of confidence of a corresponding value.

Table 3 is an example of a distanceValue configuration, and Table 4 is an example of a distanceConfidence configuration.

TABLE 3

| Descriptive Name | distanceValue |
|---|---|
| ASN.1 representation | DistanceValue : := INTEGER {zeroPointZeroOneMeter(1), oneMeter(100)} (−132768 . . . 132767) |
| Definition | Distance from one point to another. |
| Unit | 0.01 m |

TABLE 4

| Descriptive Name | distanceConfidence |
|---|---|
| ASN.1 representation | DistanceConfidence : := INTEGER {zeroPointZeroOneMeter(1), oneMeter(100)} (0 . . . 102) |
| Definition | Absolute accuracy of measurement to a confidence level of 95%, 101 shall be set if the accuracy is out of range, 102 shall be set if the accuracy data is unavailable. |
| Unit | 0.01 m |

In order to represent a zone, a distance value of a bound may be transmitted through DistanceValue. Bound confidence may be transmitted through DistanceConfidence.

DataElement indicative of DistanceValue may be configured like Table 3. DistanceValue consists of INTEGER, and may include values −132768 to 132767. For example, in this case, a unit of 1 means 0.01 meter. That is, 100 means a distance of 1 meter.

DataElement indicative of DistanceConfidence may be configured like Table 4. DistanceConfidence consists of INTEGER, and may include values 0 to 102. For example, in this case, a unit of 1 means 0.01 meter. Furthermore, 95% may mean an absolute value of measurement precision that satisfies a confidence level.

FIG. 14 is an embodiment of a division method for a Tx terminal to which the present disclosure may be applied.

Referring to FIG. 14, a transmission (Tx) terminal includes a vehicle that generates, divides and transmits a CPM. A reception (Rx) terminal includes a vehicle capable of receiving a divided CPM from a Tx terminal.

The Tx terminal acquires data related to surrounding objects (S1410). More specifically, the Tx terminal may sense surrounding objects through a sensor, and may acquire sending data including data related to the surrounding objects.

The Tx terminal generates a CPM including the data related to the surrounding objects by using the data related to the surrounding objects (S1420).

The Tx terminal divides the CPM when the size of the CPM exceeds a maximum transmission unit (MTU) based on a configured sorting type (S1430). For example, the configured sorting type may be configured to partition an area where the surrounding objects are located based on location information of the surrounding objects calculated based on a position of the Tx terminal, based on the CPM. More specifically, the CPM may be divided based on a virtual two-dimensional coordinate system having the position of the Tx terminal as the origin. Additionally, the Tx terminal may arrange the data related to the surrounding objects in order to divide the CPM.

The Tx terminal transmits the divided CPM to the Rx terminal (S1440). For example, the divided CPM may include (1) a first CPM including data related to objects located in the upper field of a horizontal axis and (2) a second CPM including data related to objects located in the rear field of the horizontal axis based on the horizontal axis of the virtual two-dimensional coordinate system. Alternatively, the divided CPM may include (1) a first CPM including data related to objects located in the left field of a vertical axis and (2) a second CPM including data related to objects located in the right field of the vertical axis based on the vertical axis of the virtual two-dimensional coordinate system. Alternatively, the divided CPM may include (1) a first CPM including data related to objects located in the inner field of a configured boundary (2) second CPM including data related to objects located in the outer field of the configured boundary based on a distance value from the surrounding objects.

Furthermore, the divided CPM may include a boundary value. For example, the divided CPM may include a median value between a distance value from an X-axis of a first object located closest to the horizontal axis included in the first CPM and a distance value from the X-axis of a second object located closest to the horizontal axis included in the second CP based on the virtual two-dimensional coordinate system. Alternatively, the divided CPM may include a median value between a distance value from a Y-axis of a first object located closest to the vertical axis included in the first CPM and a distance value from the Y-axis of a second object located closest to the vertical axis included in the second CPM based on the virtual two-dimensional coordinate system. Alternatively, the divided CPM may include a median value between a distance value from the origin of a first object located closest to the boundary included in the first CPM and a distance value from the origin of a second object located closest to the boundary included in the second CPM based on the virtual two-dimensional coordinate system.

FIG. 15 is an embodiment of a division method for a reception terminal to which the present disclosure may be applied.

Referring to FIG. 15, a Tx terminal includes a vehicle that generates, divides, and transmits a CPM. An Rx terminal includes a vehicle capable of receiving a CPM from the Tx terminal.

The Rx terminal receives a divided CPM from the Tx terminal (S1510). More specifically, the divided CPM includes data related to objects located in a specific area configured based on a virtual two-dimensional coordinate system having a position of the Tx terminal as the origin. A boundary value may be related to the boundary of the specific area.

The Rx terminal calculates a boundary value when the boundary value (boundValue) is not included in the divided CPM (S1520). For example, the boundary value may be calculated using a distance value from the X-axis of the objects located in the specific area based on the virtual two-dimensional coordinate system. More specifically, the boundary value may be calculated as a distance value from the X-axis of an object located furthest from the X-axis included in the specific area when the specific area is configured as a field located at the top and furthest from the X-axis of the virtual two-dimensional coordinate system. Alternatively, the boundary value may be calculated as a distance value from the X-axis of an object located furthest from the X-axis included in the specific area when the specific area is configured as a field located at the bottom and furthest from X-axis of the virtual two-dimensional coordinate system.

General Apparatus to which the Present Disclosure May be Applied

Hereinafter, an apparatus to which the present disclosure may be applied is described.

FIG. 16 illustrates a wireless communication device according to an embodiment of the present disclosure.

Referring to FIG. 16, the wireless communication system may include a first device 9010 and a second device 9020.

The first device 9010 may be a device related to a base station, a network node, a Tx terminal, an Rx terminal, a radio device, a wireless communication device, a vehicle, a vehicle on which a self-driving function is mounted, a connected car, a drone (unmanned aerial vehicle (UAV)), an artificial intelligence (AI) module, a robot, an augmented reality (AR) device, a virtual reality (VR) device, a mixed reality (MR) device, a hologram device, a public safety device, an MTC device, an IoT device, a medical device, a FinTech device (or financial device), a security device, a climate/environment device, a device related to 5G service or a device related to the fourth industrial revolution field in addition to the devices.

The second device 9020 may be a device related to a base station, a network node, a Tx terminal, an Rx terminal, a radio device, a wireless communication device, a vehicle, a vehicle on which a self-driving function is mounted, a connected car, a drone (unmanned aerial vehicle (UAV)), an artificial intelligence (AI) module, a robot, an augmented reality (AR) device, a virtual reality (VR) device, a mixed reality (MR) device, a hologram device, a public safety device, an MTC device, an IoT device, a medical device, a FinTech device (or financial device), a security device, a climate/environment device, a device related to 5G service or a device related to the fourth industrial revolution field in addition to the devices.

For example, the terminal may include a portable phone, a smart phone, a laptop computer, a terminal for digital broadcasting, a personal digital assistants (PDA), a portable multimedia player (PMP), a navigator, a slate PC, a tablet PC, an ultrabook, a wearable device (e.g., a watch type terminal (smartwatch), a glass type terminal (smart glass), a head mounted display (HMD)), and so on. For example, the HMD may be a display device of a form, which is worn on the head. For example, the HMD may be used to implement VR, AR or MR.

For example, the drone may be a flight vehicle that flies by a wireless control signal without a person being on the flight vehicle. For example, the VR device may include a device implementing the object or background of a virtual world. For example, the AR device may include a device implementing the object or background of a virtual world by connecting it to the object or background of the real world. For example, the MR device may include a device implementing the object or background of a virtual world by merging it with the object or background of the real world. For example, the hologram device may include a device implementing a 360-degree stereographic image by recording and playing back stereographic information using the interference phenomenon of a light beam generated when two lasers called holography are met. For example, the public safety device may include a video relay device or an imaging device capable of being worn on a user's body. For example, the MTC device and the IoT device may be a device that does not require a person's direct intervention or manipulation. For example, the MTC device and the IoT device may include a smart meter, a vending machine, a thermometer, a smart bulb, a door lock or a variety of sensors. For example, the medical device may be a device used for the purpose of diagnosing, treating, reducing, handling or preventing a disease. For example, the medical device may be a device used for the purpose of diagnosing, treating, reducing or correcting an injury or obstacle. For example, the medical device may be a device used for the purpose of testing, substituting or modifying a structure or function. For example, the medical device may be a device used for the purpose of controlling pregnancy. For example, the medical device may include a device for medical treatment, a device for operation, a device for (external) diagnosis, a hearing aid or a device for a surgical procedure. For example, the security device may be a device installed to prevent a possible danger and to maintain safety. For example, the security device may be a camera, CCTV, a recorder or a blackbox. For example, the FinTech device may be a device capable of providing financial services, such as mobile payment. For example, the FinTech device may include a payment device or point of sales (POS). For example, the climate/environment device may include a device for monitoring or predicting the climate/environment.

The first device 9010 may include at least one processor such as a processor 9011, at least one memory such as memory 9012, and at least one transceiver such as a transceiver 9013. The processor 9011 may perform the above-described functions, procedures, and/or methods. The processor 9011 may perform one or more protocols. For example, the processor 9011 may perform one or more layers of a radio interface protocol. The memory 9012 is connected to the processor 9011, and may store various forms of information and/or instructions. The transceiver 9013 is connected to the processor 9011, and may be controlled to transmit and receive radio signals.

The second device 9020 may include at least one processor such as a processor 9021, at least one memory device such as memory 9022, and at least one transceiver such as a transceiver 9023. The processor 9021 may perform the above-described functions, procedures and/or methods. The processor 9021 may implement one or more protocols. For example, the processor 9021 may implement one or more layers of a radio interface protocol. The memory 9022 is connected to the processor 9021, and may store various forms of information and/or instructions. The transceiver 9023 is connected to the processor 9021 and may be controlled transmit and receive radio signals.

The memory 9012 and/or the memory 9022 may be connected inside or outside the processor 9011 and/or the processor 9021, respectively, and may be connected to another processor through various technologies, such as a wired or wireless connection.

The first device 9010 and/or the second device 9020 may have one or more antennas. For example, the antenna 9014 and/or the antenna 9024 may be configured to transmit and receive radio signals.

FIG. 17 exemplifies a block diagram of a network node according to an embodiment of the present disclosure.

In particular, FIG. 17 is a diagram more specifically illustrating the network node of FIG. 16 if the base station is divided into a central unit (CU) and a distributed unit (DU).

Referring to FIG. 17, base stations W20 and W30 may be connected to a core network W10. The base station W30 may be connected to an adjacent base station W20. For example, an interface between the base stations W20 and W30 and the core network W10 may be called NG, and an interface between the base station W30 and an adjacent base station W20 may be called Xn.

The base station W30 may be divided into a CU W32 and DUs W34 and W36. That is, the base station W30 may be hierarchically separated and operated. The CU W32 may be connected to one or more DUs W34 and W36. For example, an interface between the CU W32 and the DUs W34 and W36 may be called F1. The CU W32 may perform functions of upper layers of the base station. The DUs W34 and W36 may perform functions of lower layers of the base station. For example, the CU W32 may be a logical node that hosts radio resource control (RRC), service data adaptation protocol (SDAP) and packet data convergence protocol (PDCP) layers of a base station (e.g., gNB). The DUs W34 and W36 may be a logical node that hosts radio link control (RLC), media access control (MAC) and physical (PHY) layers of the base station. Alternatively, the CU W32 may be a logical node that hosts the RRC and PDCP layers of a base station (e.g., an en-gNB).

Operations of the DUs W34 and W36 may be partially controlled by the CU W32. One DU W34, W36 may support one or more cells. One cell may be supported by only one DU W34, W36. One DU W34, W36 may be connected to one CU W32. One DU W34, W36 may be connected to a plurality of CUs by a proper implemented.

FIG. 18 exemplifies a block diagram of a communication device according to an embodiment of the present disclosure.

In particular, FIG. 18 is a diagram more specifically illustrating the terminal of FIG. 16.

Referring to FIG. 18, the terminal may be configured to include a processor (or digital signal processor DSP: digital signal processor Y10, an RF module (or RF unit) Y35, a power management module Y05, an antenna Y40, a battery Y55, a display Y15, a keypad Y20, a memory Y30, a subscriber identification module (SIM) card Y25 (this component is optional), a speaker Y45, and a microphone Y50. The terminal may include a single antenna or multiples antennas.

The processor Y10 implements the above-proposed functions, processes and/or methods. Layers of a wireless interface protocol may be implemented by the processor Y10.

The memory Y30 is connected to the processor Y10 and stores information related to an operation of the processor Y10. The memory Y30 may be disposed inside or outside the processor Y10, and may be connected to the processor Y10 by various well-known means.

A user inputs instruction information, such as a telephone number, by pressing or touching a button in the keypad Y20 or by voice activation using the microphone Y50, for example. The processor Y10 receives such instruction information, and processes a proper function, such as calling the telephone number, to be performed. Operational data may be extracted from the SIM card Y25 or the memory Y30. Furthermore, the processor Y10 may display instruction information or driving information on the display so that a user can recognize the instruction information or driving information or for convenience.

The RF module Y35 is connected to the processor Y10, and transmits and/or receives an RF signal. The processor Y10 forwards instruction information to the RF module Y35 in order to initiate communication, for example, so that a radio signal constituting voice communication data is transmitted. The RF module Y35 consists of a receiver and a transmitter in order to receive and transmit radio signals. The antenna Y40 functions to transmit and receive radio signals. When transmitting a radio signal, the RF module Y35 may transmit the signal in order to be processed by the processor Y10 and may convert the signal into a base band. The processed signal may be converted into audible or readable information output through the speaker Y45.

In the aforementioned embodiments, the elements and characteristics of the disclosure have been combined in a specific form. Each of the elements or characteristics may be considered to be optional unless otherwise described explicitly. Each of the elements or characteristics may be implemented in a form to be not combined with other elements or characteristics. Furthermore, some of the elements and/or the characteristics may be combined to form an embodiment of the disclosure. The sequence of the operations described in the embodiments of the disclosure may be changed. Some of the elements or characteristics of an embodiment may be included in another embodiment or may be replaced with corresponding elements or characteristics of another embodiment. It is evident that an embodiment may be constructed by combining claims not having an explicit citation relation in the claims or may be included as a new claim by amendments after filing an application.

The embodiment according to the disclosure may be implemented by various means, for example, hardware, firmware, software or a combination of them. In the case of an implementation by hardware, the embodiment of the disclosure may be implemented using one or more application-specific integrated circuits (ASICs), digital signal processors (DSPs), digital signal processing devices (DSPDs), programmable logic devices (PLDs), field programmable gate arrays (FPGAs), processors, controllers, microcontrollers, microprocessors, etc.

In the case of an implementation by firmware or software, the embodiment of the disclosure may be implemented in the form of a module, procedure or function for performing the aforementioned functions or operations. Software code may be stored in the memory and driven by the processor. The memory may be located inside or outside the processor and may exchange data with the processor through a variety of known means.

The aforementioned present disclosure may be implemented in a medium on which a program has been recorded as a computer-readable code. The computer-readable medium includes all types of recording devices in which data readable by a computer system is stored. Examples of the computer-readable medium include a hard disk drive (HDD), a solid state disk (SSD), a silicon disk drive (SDD), a ROM, a RAM, a CD-ROM, a magnetic tape, a floppy disk, an optical data storage device, etc., and also includes a thing implemented in the form of carrier waves (e.g., transmission through the Internet). Furthermore, the computer may include the processor Y120 of the terminal. Accordingly, the detailed description should not be construed as being limitative, but should be construed as being illustrative from all aspects. The scope of the disclosure should be determined by reasonable analysis of the attached claims, and all changes within the equivalent range of the disclosure are included in the scope of the disclosure.

Industrial Applicability

The aforementioned communication method may be applied to various wireless communication systems, including IEEE 802.16x, 802.11x system, in addition to the 3GPP system. Moreover, the proposed method may also be applied to an mmWave communication system using an ultra high frequency band.

The invention claimed is:

1. A collective perception service message (CPM) segmentation method for a transmitting vehicle-to-everything (V2X) communication device, the method comprising:
   acquiring data related to surrounding objects;
   generating a CPM including the data related to the surrounding objects by using the data related to the surrounding objects;
   dividing the CPM, based on a sorting type which is configured in the transmitting V2X communication device, when a size of the CPM exceeds a maximum transmission unit (MTU); and
   transmitting the divided CPM to a receiving V2X communication device,
   wherein the Sorting type is configured, based on the CPM, to partition an area where the surrounding objects are located by using location information of the surrounding objects calculated based on a location of the first transmitting V2X communication device.

2. The method of claim 1,
   wherein the dividing the CPM divides based on a virtual two-dimensional coordinate system having the location of the transmitting V2X communication device as an origin.

3. The method of claim 2
   wherein, based on a horizontal axis of the virtual two-dimensional coordinate system, the divided CPM includes (1) a first CPM including data related to objects located in an upper field of the horizontal axis and (2) a second CPM including data related to objects located in a rear field of the horizontal axis.

4. The method of claim 3
   wherein, based on the virtual two-dimensional coordinate system, the divided CPM includes a median value between a distance value from an X-axis of a first object located closest to the horizontal axis included in the first CPM and a distance value from an X-axis of a second object located closest to the horizontal axis included in the second CPM.

5. The method of claim 2
   wherein, based on a vertical axis of the virtual two-dimensional coordinate system, the divided CPM includes (1) a first CPM including data related to objects located in a left field of the vertical axis and (2) a second CPM including data related to objects located in a right field of the vertical axis.

6. The method of claim 5,
   wherein, based on the virtual two-dimensional coordinate system, the divided CPM includes a median value between a distance value from a Y-axis of a first object located closest to the vertical axis included in the first CPM and a distance value from the Y-axis of a second object located closest to the vertical axis included in the second CPM.

7. The method of claim 2 wherein, based on a distance value from the surrounding objects, the divided CPM includes (1) a first CPM including data related to objects located in an inner field of a configured boundary and (2) second CPM including data related to objects located in an outer field of the configured boundary.

8. The method of claim 7, wherein, based on the virtual two-dimensional coordinate system, the divided CPM includes a median value between a distance value from the origin of a first object located closest to the boundary included in the first CPM and a distance value from the origin of a second object located closest to the boundary included in the second CPM.

9. The method of claim 1, wherein the dividing the CPM comprises: arranging the data related to the surrounding objects based on the sorting type configured in the transmitting V2X communication device.

10. A collective perception service message (CPM) segmentation method for a receiving second vehicle-to-everything (V2X) communication device, the method comprising:
receiving a divided CPM from a transmitting V2X communication device; and
calculating a boundary value (boundValue) when the boundary value is not included in the divided CPM,
wherein the divided CPM includes data related to objects located in a specific area configured based on a virtual two-dimensional coordinate system having the location of the transmitting V2X communication device as an origin, and
wherein the boundary value is related to a boundary of the specific area.

11. The method of claim 10, wherein the calculating a boundary value uses a distance value from an X-axis of the objects located in the specific area based on the virtual two-dimensional coordinate system.

12. The method of claim 11, wherein, when the specific area is configured as a field located at a top and furthest from the X-axis of the virtual two-dimensional coordinate system, the boundary value is calculated as a distance value from the X-axis of an object located furthest from the X-axis included in the specific area.

13. The method of claim 11, wherein, when the specific area is configured as a field located at a bottom and furthest from X-axis of the virtual two-dimensional coordinate system, the boundary value is calculated as a distance value from the X-axis of an object located furthest from the X-axis included in the specific area.

14. A vehicle-to-everything (V2X) communication device for performing collective perception service message (CPM) segmentation, comprising:
a sensor;
a transceiver;
a memory; and
a processor for controlling the sensor, the transceiver, and the memory,
wherein the processor is configured to:
acquire data related to surrounding objects through the sensor,
generate a CPM including data related to the surrounding objects by using the data related to the surrounding objects,
dividing the CPM, based on a sorting type which is configured in the V2X communication device, when a size of the CPM exceeds MTU (Maximum Transmission Unit),
transmitting the divided CPM to a receiving V2X communication device through the transceiver,
wherein the Sorting type is configured, based on the CPM, to partition an area where the surrounding objects are located by using location information of the surrounding objects calculated based on a location of the V2X communication device.

15. The V2X communication device of claim 14, wherein the CPM is divided based on a virtual two-dimensional coordinate system having the location of the V2X communication device as an origin.

16. The V2X communication device of claim 15, wherein, based on a horizontal axis of the virtual two-dimensional coordinate system, the divided CPM includes (1) a first CPM including data related to objects located in an upper field of the horizontal axis and (2) a second CPM including data related to objects located in a rear field of the horizontal axis.

17. The V2X communication device of claim 16, wherein, based on the virtual two-dimensional coordinate system, the divided CPM includes a median value between a distance value from an X-axis of a first object located closest to the horizontal axis included in the first CPM and a distance value from an X-axis of a second object located closest to the horizontal axis included in the second CPM.

18. The V2X communication device of claim 15, wherein, based on a vertical axis of the virtual two-dimensional coordinate system, the divided CPM includes (1) a first CPM including data related to objects located in a left field of the vertical axis and (2) a second CPM including data related to objects located in a right field of the vertical axis.

19. The V2X communication device of claim 15, wherein, based on a distance value from the surrounding objects, the divided CPM includes (1) a first CPM including data related to objects located in an inner field of a configured boundary and (2) second CPM including data related to objects located in an outer field of the configured boundary.

20. The V2X communication device of claim 14, wherein the processor is further configured to arrange the data related to the surrounding objects based on the sorting type configured in the V2X communication device.

* * * * *